(12) United States Patent
Takamizawa et al.

(10) Patent No.: US 12,523,835 B2
(45) Date of Patent: Jan. 13, 2026

(54) OPTICAL TERMINATION BOX

(71) Applicant: Fujikura Ltd., Tokyo (JP)

(72) Inventors: Hiroyuki Takamizawa, Sakura (JP);
Toshiaki Nakajima, Sakura (JP);
Tomoyuki Shinoda, Chiba (JP)

(73) Assignee: Fujikura Ltd., Tokyo (JP)

( * ) Notice: Subject to any disclaimer, the term of this patent is extended or adjusted under 35 U.S.C. 154(b) by 283 days.

(21) Appl. No.: 18/269,461

(22) PCT Filed: Nov. 12, 2021

(86) PCT No.: PCT/JP2021/041785
§ 371 (c)(1),
(2) Date: Jun. 23, 2023

(87) PCT Pub. No.: WO2022/224472
PCT Pub. Date: Oct. 27, 2022

(65) Prior Publication Data
US 2024/0288649 A1    Aug. 29, 2024

(30) Foreign Application Priority Data

Apr. 23, 2021   (JP) ................................ 2021-073031

(51) Int. Cl.
*G02B 6/44*   (2006.01)
*G02B 6/38*   (2006.01)

(52) U.S. Cl.
CPC ........ *G02B 6/44515* (2023.05); *G02B 6/3897* (2013.01)

(58) Field of Classification Search
None
See application file for complete search history.

(56) References Cited

U.S. PATENT DOCUMENTS

| | | | | |
|---|---|---|---|---|
| 10,795,105 | B1* | 10/2020 | Li | G02B 6/4455 |
| 2005/0232565 | A1* | 10/2005 | Heggestad | G02B 6/44528 |
| | | | | 385/135 |
| 2006/0210229 | A1* | 9/2006 | Scadden | G02B 6/44528 |
| | | | | 385/135 |

(Continued)

FOREIGN PATENT DOCUMENTS

| | | |
|---|---|---|
| JP | 2005-181600 A | 7/2005 |
| JP | 2006-227041 A | 8/2006 |

(Continued)

OTHER PUBLICATIONS

International Search Report issued in corresponding International Application No. PCT/JP2021/041785 mailed Jan. 11, 2022 (8 pages).

*Primary Examiner* — Jerry Rahll
(74) *Attorney, Agent, or Firm* — Osha Bergman Watanabe & Burton LLP

(57) ABSTRACT

An optical termination box includes a housing, a module case slidably attached in a front-rear direction with respect to the housing, a front adapter fixed to a front end of the module case, an adapter holder disposed on a rear end side of the module case, a rear adapter fixed to the adapter holder, and an optical fiber that connects the front adapter to the rear adapter. The adapter holder is fixed to a rear end portion of the housing such that the rear adapter is exposed rearward of the housing.

2 Claims, 16 Drawing Sheets

(56) References Cited

U.S. PATENT DOCUMENTS

| | | | |
|---|---|---|---|
| 2008/0175550 A1* | 7/2008 | Coburn | G02B 6/4453 385/134 |
| 2010/0054683 A1* | 3/2010 | Cooke | G02B 6/44526 385/135 |
| 2010/0322581 A1* | 12/2010 | Cooke | G02B 6/44526 385/135 |
| 2011/0235985 A1* | 9/2011 | Cote | G02B 6/4453 211/119.003 |
| 2023/0008823 A1* | 1/2023 | Milette | G02B 6/44526 |
| 2024/0004155 A1* | 1/2024 | Watanabe | G02B 6/3879 |
| 2024/0353644 A1* | 10/2024 | Cui | G02B 6/3825 |

FOREIGN PATENT DOCUMENTS

| | | |
|---|---|---|
| JP | 2008-032843 A | 2/2008 |
| JP | 2019-86696 A | 6/2019 |
| JP | 2019-211698 A | 12/2019 |
| WO | 2018/193675 A1 | 10/2018 |

\* cited by examiner ions No. 2021-073031, filed Apr. 23, 2021, the entire
OPTICAL TERMINATION BOX

CROSS-REFERENCE TO RELATED APPLICATIONS

This application claims priority to Japanese Patent Application No. 2021-073031, filed Apr. 23, 2021, the entire content of which is incorporated herein by reference.

BACKGROUND

Technical Field

The present invention relates to an optical termination box.

Description of the Related Art

Patent Document 1 discloses an optical termination box including a housing (outer tray, inner strut), a tray (inner tray) provided to be slidable with respect to the housing, and an adapter provided in the tray to connect optical cords to each other. In such an optical termination box, it is possible to insert or remove an optical connector of an optical cord or the like into or from the adapter in a state in which the tray is pulled out of the housing.

PATENT DOCUMENTS

Patent Document 1: Japanese Patent Application Publication No. 2008-032843

However, in the termination box of Patent Document 1, since the adapter is provided inside the tray, it is necessary to pull part of each optical cord into the tray. For this reason, the dimensions of the optical termination box (especially the tray and housing) may be increased by a space for storing the optical cords in the tray.

SUMMARY

One or more embodiments provide a small-sized optical termination box.

An optical termination box according to one or more embodiments includes a housing; a module case configured to be slidably attached in a front-rear direction with respect to the housing; a front adapter configured to be fixed to a front end of the module case; an adapter holder configured to be disposed on a rear end side of the module case; a rear adapter configured to be fixed to the adapter holder; and an optical fiber configured to connect the front adapter and the rear adapter to each other. The adapter holder is configured to fix to a rear end portion of the housing such that the rear adapter is exposed rearward of the housing.

In the above optical termination box, an optical cord connected to the front adapter and an optical cord connected to the rear adapter can be connected to each other. By pulling out the module case (front adapter) forward of the housing in a state in which the adapter holder is fixed to the rear end portion of the housing, the optical cord can be inserted into and removed from the front adapter. Since the adapter holder (rear adapter) is fixed to the rear end portion of the housing, even when the module case is pulled out forward, the optical cord connected to the rear adapter will not enter the inside of the housing. Accordingly, a space that accommodates the optical cord inside the housing becomes unnecessary. As a result, a small-sized optical termination box can be obtained.

In the above optical termination box, the adapter holder may include a first locking portion that is engaged to a rear end portion of the housing to restrict movement of the adapter holder in the front-rear direction with respect to the housing, and a second locking portion that is engaged to a rear end portion of the module case to restrict movement of the adapter holder in the front-rear direction with respect to the module case. In a state in which the adapter holder is disposed at a first position where the adapter holder is moved to a first side in a perpendicular direction perpendicular to the front-rear direction, the first locking portion may be engaged to the rear end portion of the housing, and an engagement of the second locking portion to the rear end portion of the module case is released. In a state in which the adapter holder is disposed at a second position where the adapter holder is moved to a second side in the perpendicular direction, the second locking portion may be engaged to the rear end portion of the module case, and an engagement of the first locking portion to the rear end portion of the housing is released.

The optical termination box may include the holding member that holds the adapter holder at the first position, and the holding member may be attached to the housing to be movable between a restricted position where movement of the adapter holder from the first position to the second position is restricted, and a retracted position where the movement of the adapter holder from the first position to the second position is allowed.

According to one or more embodiments, a small-sized optical termination box can be obtained.

DESCRIPTION OF THE EMBODIMENTS

Figure 1:
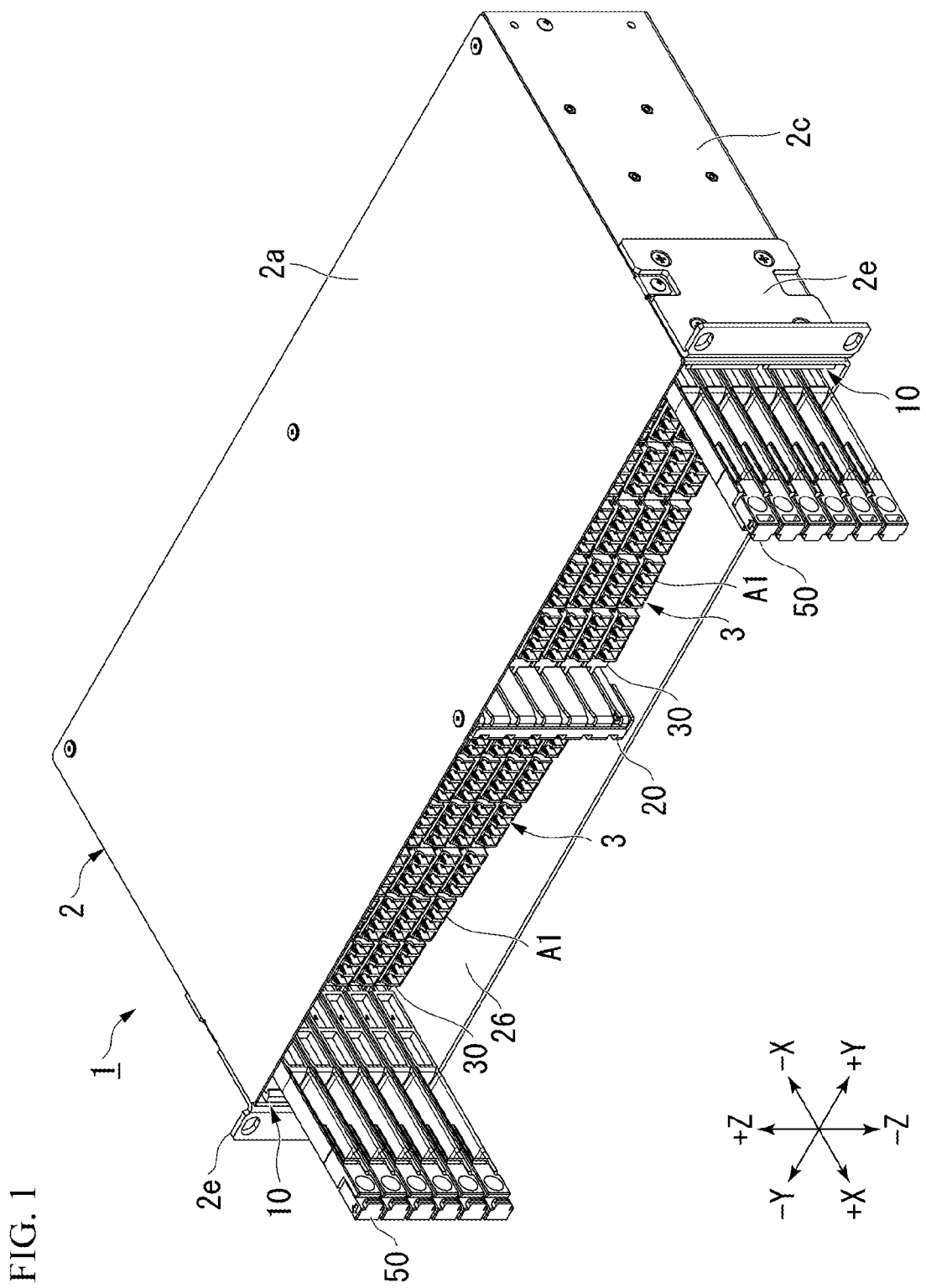
FIG. 1 is a perspective view of an optical termination box according to one or more embodiments as viewed from the front.

An optical termination box of one or more embodiments will be described below with reference to the drawings. As shown in FIG. 1, the optical termination box 1 includes a housing 2, a plurality of optical wiring units 3, a plurality of side rails 10, and a central rail 20.

Figure 3:
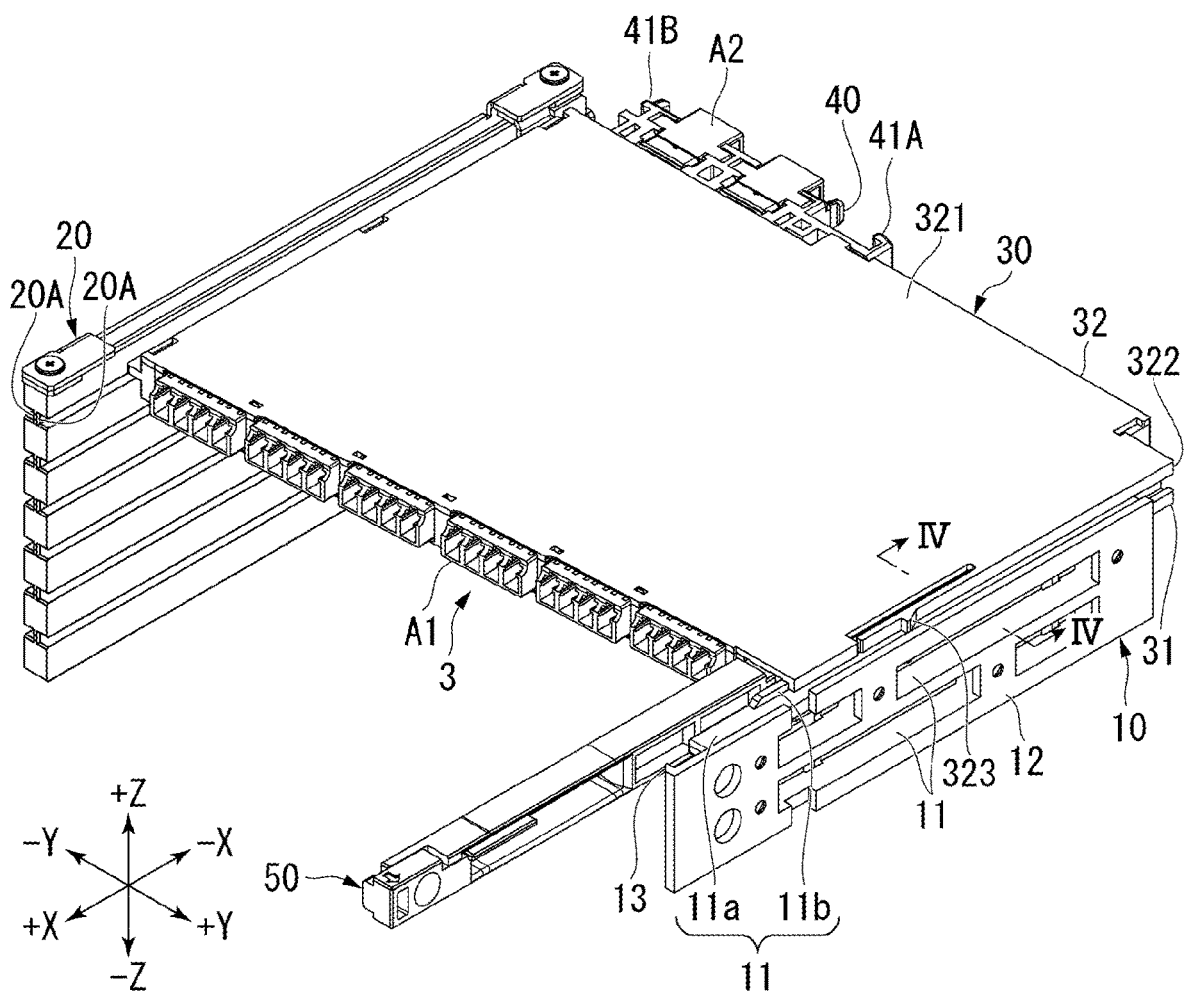
FIG. 3 is a perspective view showing a central rail, an optical wiring unit, and side rails pulled from the optical termination box of FIG. 1.
Figure 5:
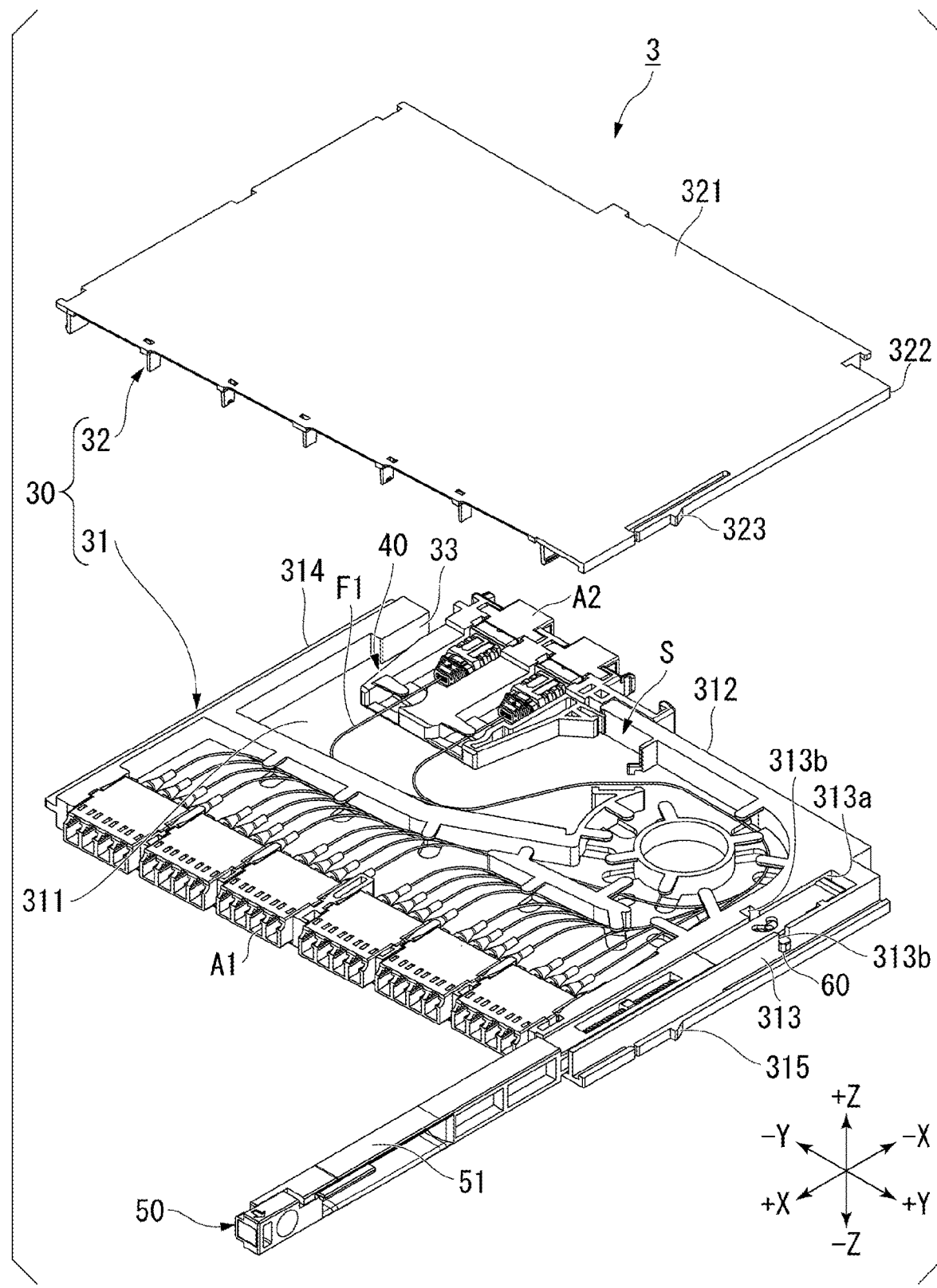
FIG. 5 is a perspective view showing a state in which a module case is separated into a lid body and a tray in the optical wiring unit of FIG. 3.

As shown in FIGS. 3 and 5, each optical wiring unit 3 includes a module case 30, an adapter holder 40, a front adapter A1, a rear adapter A2, and an optical fiber F1. The optical wiring unit 3 of one or more embodiments further includes an operating member 50 and a slide piece 60. The module case 30 is configured to be slidable with respect to a housing 2 (see FIG. 1) in a state in which the module case 30 is supported by the side rails 10 and the central rail 20. The module case 30 has a tray 31 and a lid body 32.

(Definition of Direction)

In one or more embodiments, a direction (sliding direction) in which the module case 30 of the optical wiring unit 3 slides with respect to the housing 2 is referred to as a front-rear direction X. In the front-rear direction X, a side (+X side) where the module case 30 is pulled out of the housing 2 is referred to as a front side, and a side (−X side) where the module case 30 is stored in the housing 2 is referred to as a rear side. A direction in which the tray 31 and the lid body 32 face each other is referred to as an up-down direction Z. In the up-down direction Z, the lid body 32 side (+Z side) is referred to as an upper side, and the tray 31 side (−Z side) is referred to as a lower side. A direction perpendicular to both the front-rear direction X and the up-down direction Z is referred to as a left-right direction Y (perpendicular direction). In the left-right direction Y, one side (+Y side) is referred to as a right side, and the opposite side (−Y side) is referred to as a left side. In addition, the up-down direction Z may not coincide with the vertical direction.

As shown in FIG. 1, a position where the module case 30 is stored inside the housing 2 is referred to as a "storage position". The module case 30 is movable to a "pull-out position" where the module case 30 is pulled out of the housing 2 by sliding forward from the storage position.

The operating member 50 protrudes forward from the module case 30. Even in a case where the module case 30 is located at the storage position, the operating member 50 protrudes forward from an opening portion of the front side of the housing 2.

Figure 2:
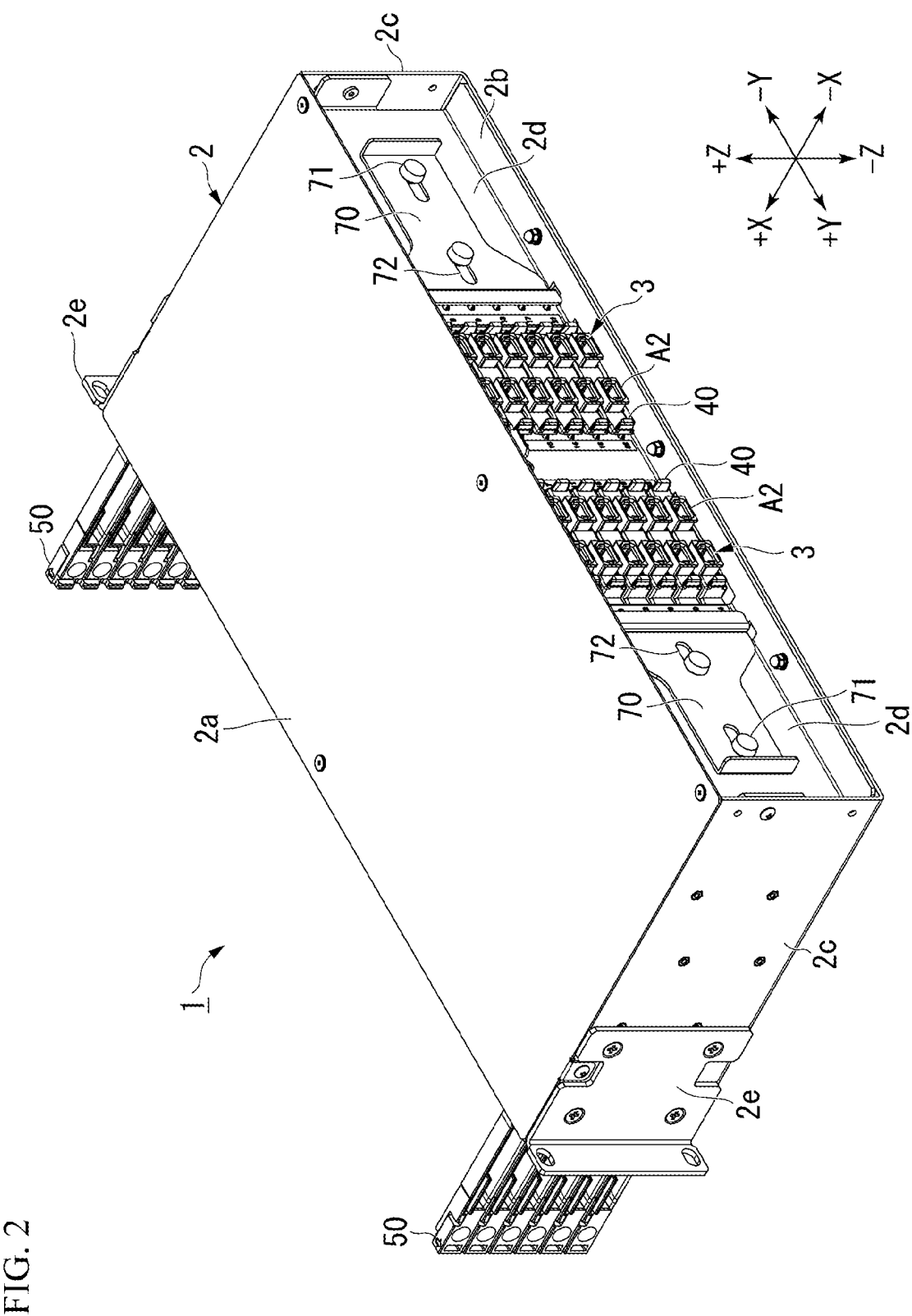
FIG. 2 is a perspective view of the optical termination box of FIG. 1 as viewed from the rear.

As shown in FIGS. 1 and 2, the housing 2 has an upper plate 2a, a lower plate 2b, a pair of side plates 2c, and a back plate 2d. The upper plate 2a and the lower plate 2b face each other in the up-down direction Z, and the pair of side plates 2c face each other in the left-right direction Y. A fixing member 2e that fixes the optical termination box 1 to an external structure (wall, pillar, cabinet, or the like) is provided on an outer side surface of each side plate 2c in the left-right direction Y. The back plate 2d forms a rear end portion of the housing 2 and partially covers an opening of the rear side of the housing 2. The back plate 2d serves as a stopper when the module case 30 is slid rearward.

Figure 7:
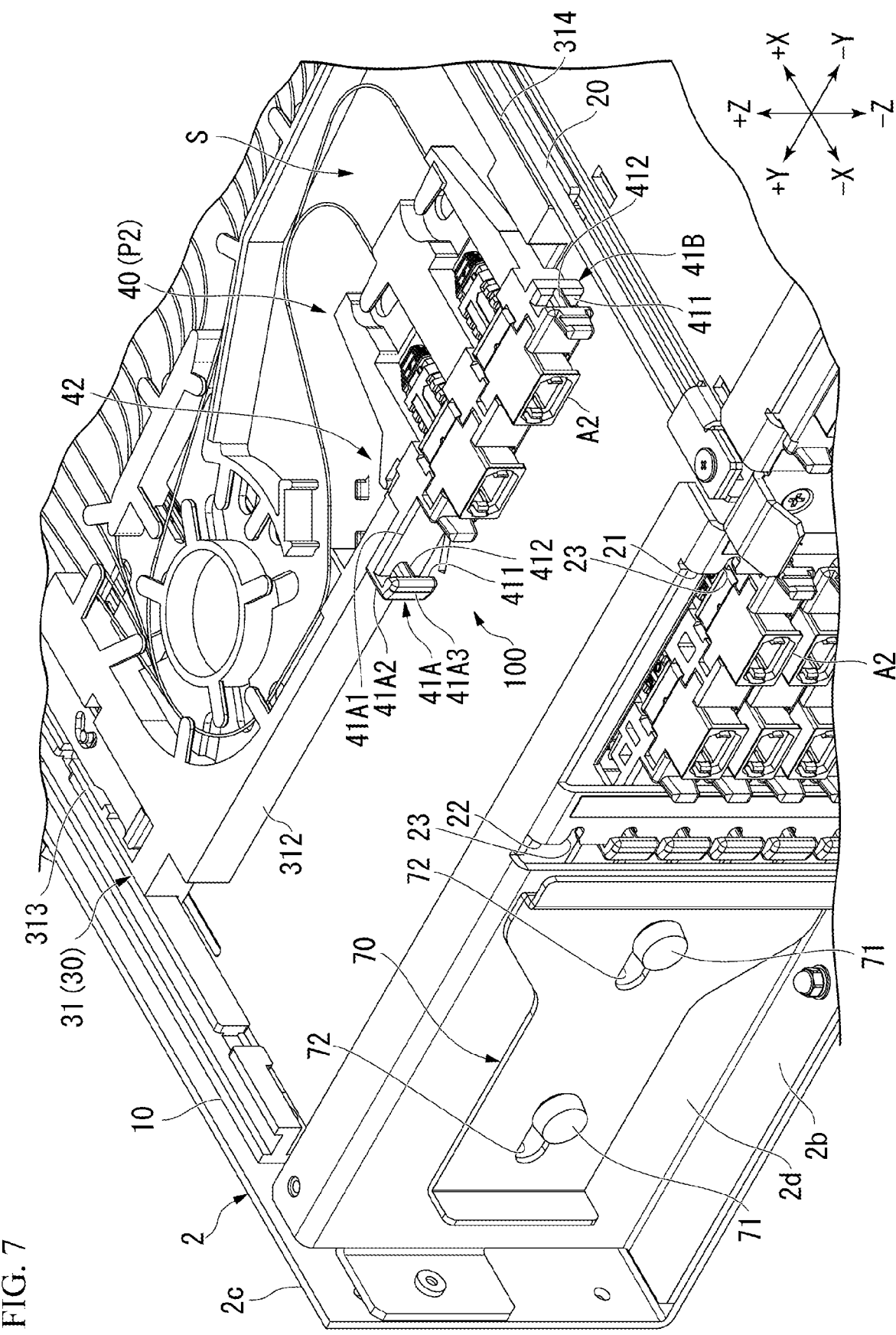
FIG. 7 is a perspective view showing a state in which, in the optical termination box of FIGS. 1 and 2, an upper plate of a housing and the lid body of the uppermost optical wiring unit are removed and the uppermost optical wiring unit is moved forward.
Figure 8:
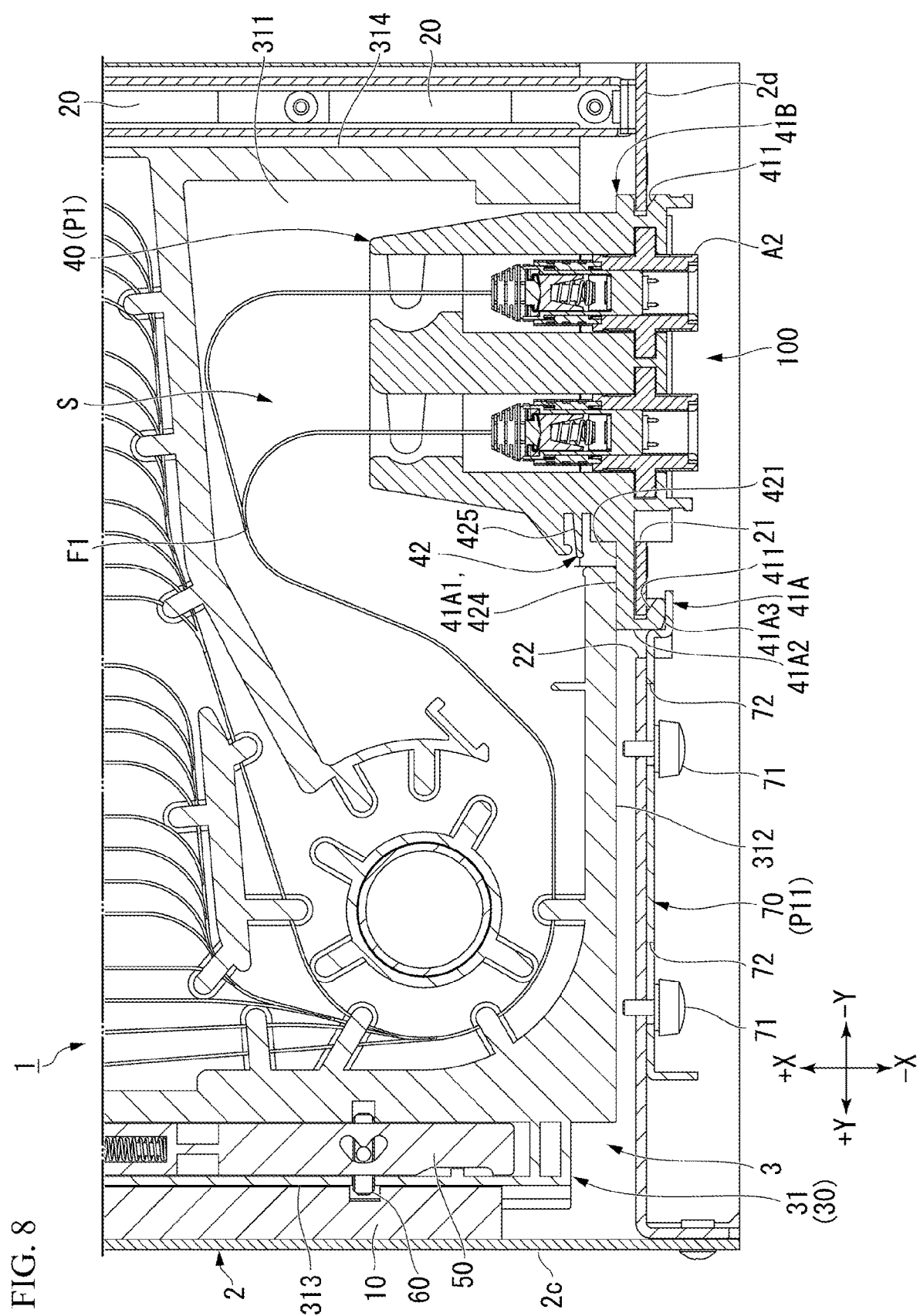
FIG. 8 is a diagram showing a state in which, in the optical termination box of FIGS. 1 and 2, the adapter holder is disposed at a first position engaged to a rear end portion of the housing and a holding member is disposed at a restricted position.

As shown in FIGS. 7 and 8, a first opening portion 21 that allows the rear adapter A2 to protrude rearward of the housing 2, and a second opening portion 22 that allows second and third extension portions 41A2 and 41A3 of the adapter holder 40, which will be described below, to protrude rearward of the housing 2, are formed in the back plate 2d. By exposing the rear adapter A2 to the rear side of the housing 2, an external optical connector (not shown) can be connected to the rear adapter A2.

As shown in FIG. 1, the central rail 20 is located at a central portion in the left-right direction Y inside the housing 2. As shown in FIG. 3, the central rail 20 has a plurality of grooves 20A that extend in the front-rear direction X. Half of the grooves 20A are recessed leftward from a right side surface of the central rail 20, and the remaining half are recessed rightward from a left side surface of the central rail 20. The number of grooves 20A matches the number of optical wiring units 3.

In one or more embodiments, as shown in FIG. 1, six optical wiring units 3 are disposed side by side in the up-down direction Z on the right side of the central rail 20. Additionally, six optical wiring units 3 are disposed side by side in the up-down direction Z on the left side of the central rail 20. That is, the optical termination box 1 of one or more embodiments includes a total of 12 optical wiring units 3. However, the number of optical wiring units 3 can be changed appropriately. Additionally, the optical wiring units 3 may be supported by, for example, a pair of side rails 10 without providing the central rail 20. That is, in the optical termination box 1, the optical wiring units 3 may not be disposed side by side in the left-right direction Y.

The optical wiring unit 3 located on the right side of the central rail 20 and the optical wiring unit 3 located on the left side thereof are substantially bilaterally symmetrical in shape. For example, the operating member 50 is disposed at a right end portion of the module case 30 in the right optical wiring unit 3, and the operating member 50 is disposed at a left end portion of the module case 30 in the left optical wiring unit 3. Correspondingly, the shape of the side rail 10 located on the right side and the side rail 10 located on the left side are substantially bilaterally symmetrical.

In the following description, the structure of the right optical wiring unit 3 and the side rail 10 and the structure of a right portion of the housing 2 will be described in detail, as representatives of the right and left optical wiring units 3 and side rails 10. That is, the following description is also a description for the left optical wiring unit 3 and side rail 10 and a left portion of the housing 2. In the left-right direction Y, a side closer to the central rail 20 is referred to as "an inner side in the left-right direction Y", and the opposite side (a side closer to the side rail 10) is referred to as "an outer side in the left-right direction Y". Based on the right optical wiring unit 3, the −Y side is the "inner side in the left-right direction Y", and the +Y side is the "outer side in the left-right direction Y".

Figure 4:
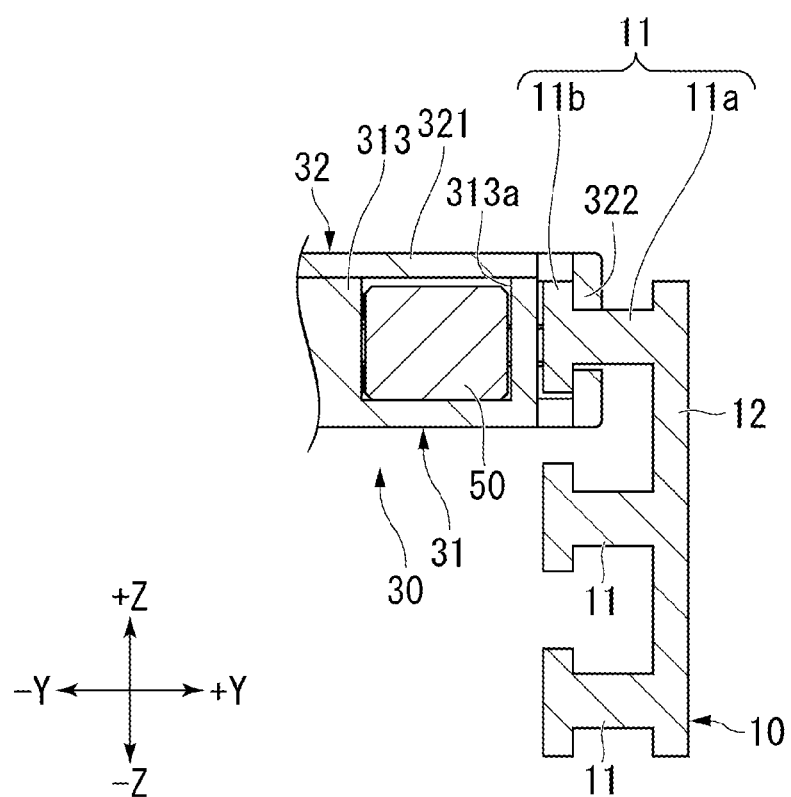
FIG. 4 is a sectional view taken along line IV-IV of FIG. 3.

Two side rails 10 are disposed side by side in the up-down direction Z at both outer end portions of the housing 2 in the left-right direction Y. As shown in FIGS. 3 and 4, each side rail 10 has three slide support portions 11 that slidably support the module case 30 of the optical wiring unit 3. That is, one side rail 10 is configured to support three optical wiring units 3 lined up in the up-down direction Z. However, the number of slide support portions 11 included in the side rail 10 can be changed appropriately. For example, the side rail 10 may have six slide support portions 11. In this case, one side rail 10 may be disposed at each outer end portion of the housing 2 in the left-right direction Y.

Figure 11:
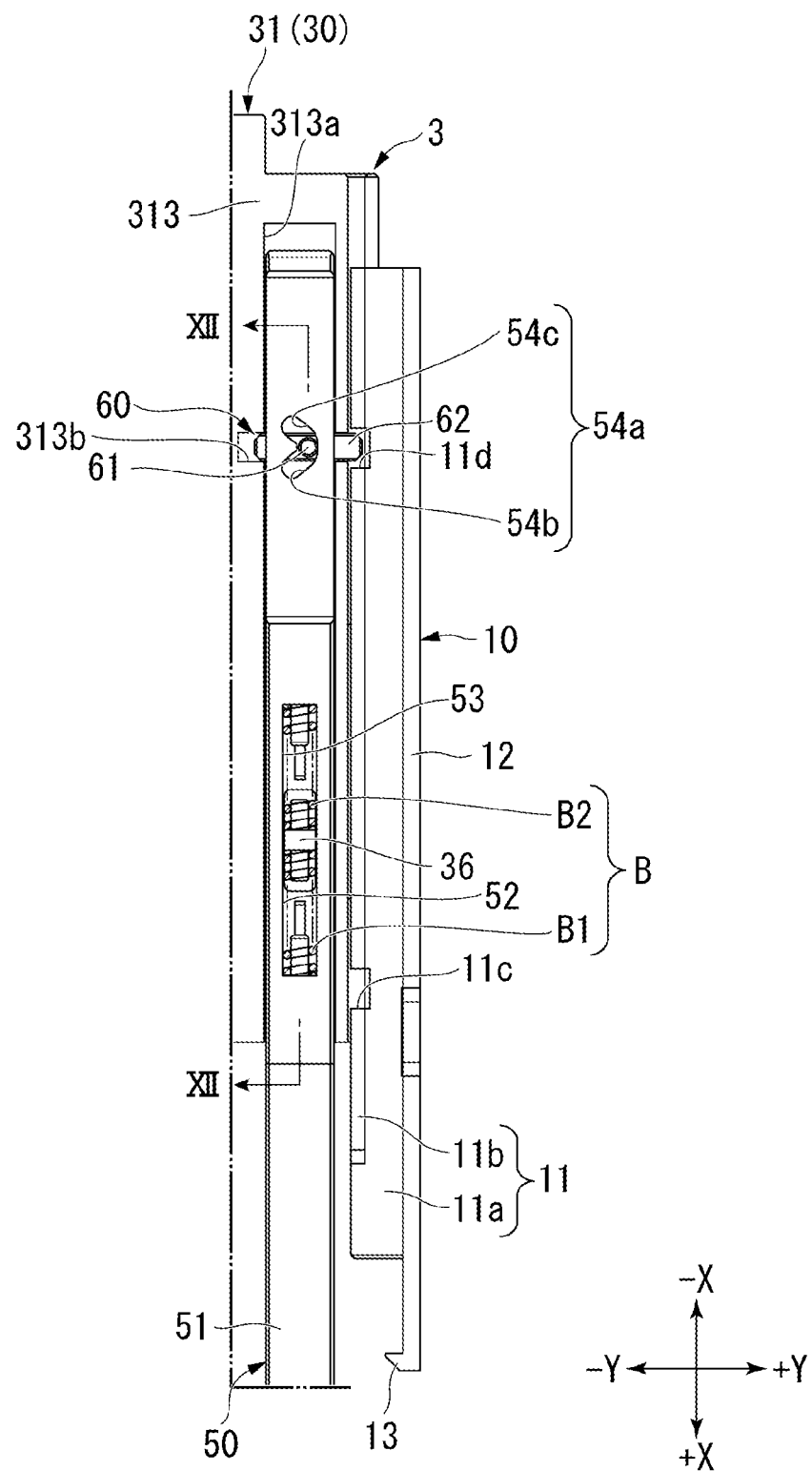
FIG. 11 is a plan view around a slide piece in FIGS. 5 and 6.

As shown in FIGS. 3, 4, and 11, the side rail 10 has an attachment portion 12 and a rail-side restricting portion 13 in addition to the plurality of slide support portions 11. The attachment portion 12 is a portion that attaches the side rail 10 to the side plate 2c (see FIGS. 1 and 2) of the housing 2, and has a plate shape that extends in the up-down direction Z and the front-rear direction X. The plurality of slide support portions 11 are disposed side by side in the up-down direction Z and coupled to each other by the attachment portion 12.

Each slide support portion 11 has a rail body portion 11a and a projecting portion 11b. The rail body portion 11a protrudes inward in the left-right direction Y from the attachment portion 12. The projecting portion 11b protrudes upward and downward from an inner end portion of the rail body portion 11a in the left-right direction Y. The rail-side restricting portion 13 protrudes inward in the left-right direction Y from a front end portion of the attachment portion 12. The rail-side restricting portion 13 has a surface (rear surface) facing the rear side and an inclined surface facing the front side. The inclined surface of the rail-side restricting portion 13 is inclined inward in the left-right direction Y toward the rear side.

Figure 6:
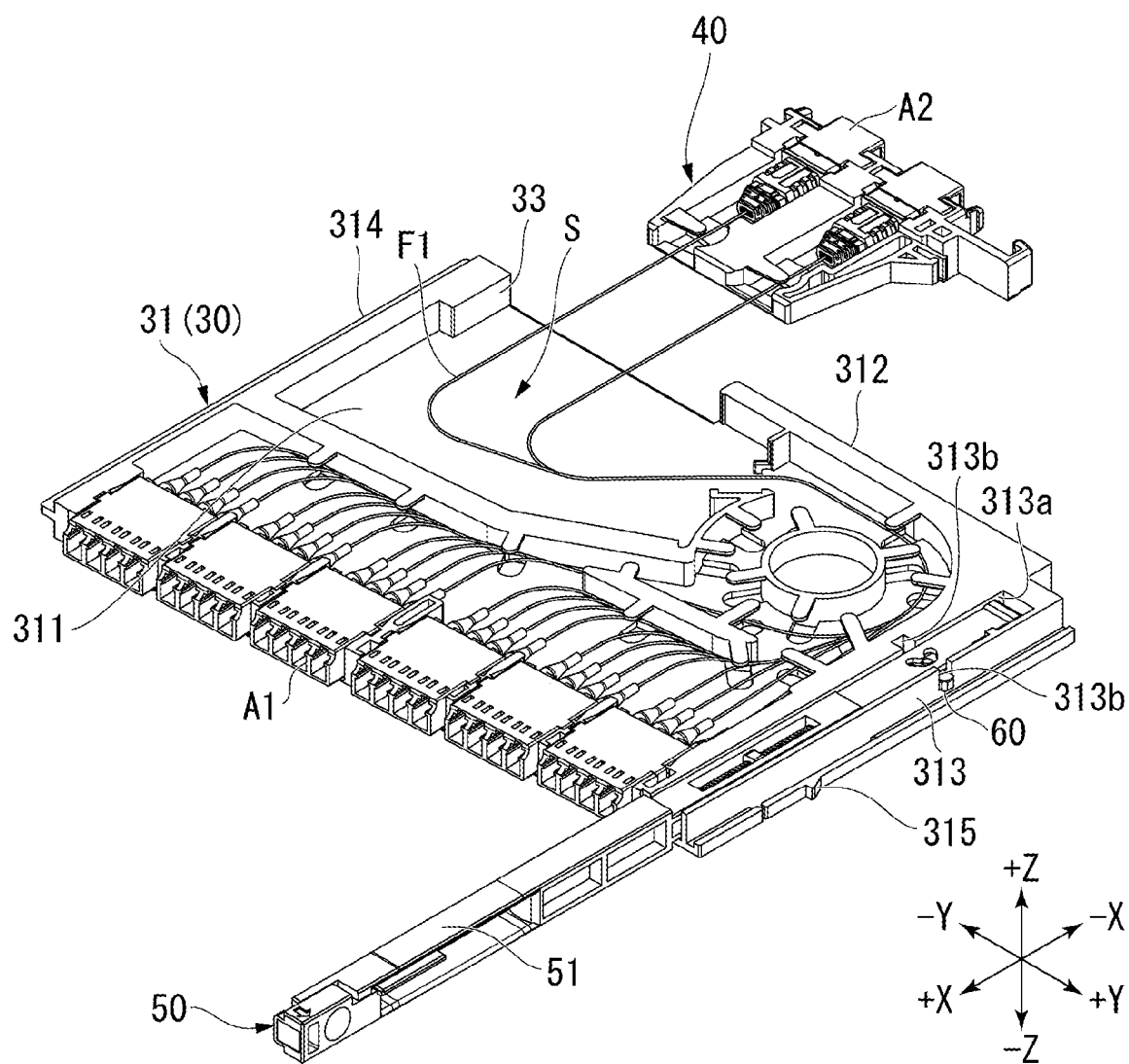
FIG. 6 is a perspective view showing a state in which a connector holder is separated from the tray of the module case in the optical wiring unit of FIG. 5.

As shown in FIGS. 5 and 6, the tray 31 of the module case 30 has a bottom plate 311, a rear wall portion 312, a pair of side wall portions 313 and 314, and a first unit-side restricting portion 315. The bottom plate 311 has a plate shape that extends in the front-rear direction X and the left-right direction Y with the up-down direction Z as a plate thickness direction. The rear wall portion 312 and the side wall portions 313 and 314 protrude upward from the bottom plate 311.

The rear wall portion 312 forms a rear end portion of the module case 30 and extends in the left-right direction Y at a rear end of the bottom plate 311. However, the rear wall portion 312 is not formed on a portion of the rear end of the bottom plate 311 in the left-right direction Y (an inner portion in the left-right direction Y in the shown example). A portion of the tray 31 where the rear wall portion 312 is not formed constitutes an opening portion 33 of the module case 30 through which the adapter holder 40 and the rear adapter A2 are inserted and removed in the front-rear direction X with respect to the module case 30.

The pair of side wall portions 313 and 314 is disposed at both end portions of the bottom plate 311 in the left-right direction Y. A storage portion 313a that stores a part of the operating member 50 is formed in the outer side wall portion 313 disposed at the outer end portion of the bottom plate 311 in the left-right direction Y out of the pair of side wall portions 313 and 314. The storage portion 313a is a recessed portion that is recessed downward from an upper surface of the outer side wall portion 313 and extends in the front-rear direction X. The storage portion 313a is open forward, and a front portion of the operating member 50 protrudes forward from the storage portion 313a. The operating member 50 is slidable in the front-rear direction X within the storage portion 313a.

The outer side wall portion 313 has a pair of support portions 313b that supports the slide piece 60 to be slidable in the left-right direction Y. Each support portion 313b is a recessed portion that is recessed downward from the upper surface of the outer side wall portion 313. The pair of support portions 313b is formed to sandwich the storage portion 313a in the left-right direction Y. The pair of support portions 313b is disposed at the same position in the front-rear direction X.

The first unit-side restricting portion 315 protrudes outward in the left-right direction Y from a side surface (an outer end surface in the left-right direction Y) of the bottom plate 311. The first unit-side restricting portion 315 has a surface (front surface) that faces the front side and an inclined surface that faces the rear side. The inclined surface of the first unit-side restricting portion 315 is inclined inward in the left-right direction Y toward the rear side.

A portion of the tray 31, in which the first unit-side restricting portion 315 is formed, is formed to be elastically deformable in the left-right direction Y with respect to the other portions of the tray 31. Accordingly, the first unit-side restricting portion 315 is elastically displaceable toward the inner side of the tray 31 in the left-right direction Y with respect to the other portions of the tray 31.

The lid body 32 shown in FIGS. 3 and 5 covers the tray 31 from above and is fixed to the tray 31. The lid body 32 has a top plate 321, side ribs 322, and a second unit-side restricting portion 323. The top plate 321 has a plate shape that extends in the front-rear direction X and the left-right direction Y with the up-down direction Z as the plate thickness direction. The top plate 321 faces an upper side of the bottom plate 311 of the tray 31 with a space therebetween. A space between the top plate 321 and the bottom plate 311 is an accommodation space S of the module case 30 that accommodates the front adapter A1, the adapter holder 40, the rear adapter A2, and the optical fiber F1.

As shown in FIG. 4, the side rib 322 protrudes downward from an outer end portion of the top plate 321 in the left-right direction Y. The projecting portion 11b of the side rail 10 is sandwiched between the side rib 322 and the outer side wall portion 313 of the tray 31. Accordingly, the position of the module case 30 in the left-right direction Y with respect to the side rails 10 is determined.

The first unit-side restricting portion 323 shown in FIGS. 3 and 5 protrudes outward in the left-right direction Y from the side surface of the top plate 321 (outer side surface in the left-right direction Y). The second unit-side restricting portion 323 has a surface (front surface) that faces the front side and an inclined surface that faces the rear side. The inclined surface of the second unit-side restricting portion 323 is inclined inward in the left-right direction Y toward the rear side.

A portion of the lid body 32 in which the second unit-side restricting portion 323 is formed is formed to be elastically deformable in the left-right direction Y with respect to the other portions of the lid body 32. Accordingly, the second unit-side restricting portion 323 is elastically displaceable toward the inner side of the lid body 32 in the left-right direction Y with respect to the other portions of the lid body 32.

The unit-side restricting portions 315 and 323 of the tray 31 and the lid body 32 that constitute the module case 30 are disposed at the same position in the front-rear direction X and the left-right direction Y. The unit-side restricting portions 315 and 323 are disposed apart from each other in the up-down direction Z. The rail-side restricting portion 13 of the side rail 10 is formed so as to straddle the unit-side restricting portions 315 and 323 in the up-down direction Z. When the optical wiring unit 3 (especially the module case 30) is set in the housing 2 and when the optical wiring unit 3 is placed on the side rail 10 and slid rearward, the inclined surface of the unit-side restricting portion 315 and the rail-side restricting portion 13 come into contact with each other and the inclined surface of the unit-side restricting portion 323 and the rail-side restricting portion 13 come into contact with each other. Accordingly, the portions where the unit-side restricting portions 315 and 323 are formed are elastically deformed inward in the left-right direction Y, and the unit-side restricting portions 315 and 323 are retracted inward in the left-right direction Y.

After the unit-side restricting portions 315 and 323 surmount the rail-side restricting portions 13 rearward, the portions where the unit-side restricting portions 315 and 323 are formed are restored and deformed, and the front surfaces of the unit-side restricting portions 315 and 323 and the rear surface of the rail-side restricting portion 13 face each other in the front-rear direction X. For this reason, when the optical wiring unit 3 is slid forward with respect to the side rail 10, the front surfaces of the unit-side restricting portions 315 and 323 come into contact with the rear surface of the rail-side restricting portion 13, and restrict further forward movement of the optical wiring unit 3. In this case, the position of the optical wiring unit 3 is the aforementioned "pull-out position".

The front adapter A1 of the optical wiring unit 3 is fixed to a front end of the module case 30. A plurality of the front adapters A1 (six in the shown example) are disposed side by side in the left-right direction Y. Each front adapter A1 protrudes forward from the module case 30. A plurality of single-core connectors (not shown) attached to optical cords (not shown) can be connected to a front end of each front adapter A1. A plurality of optical fibers F1 that connect the front adapter A1 and the rear adapter A2 to each other are connected to a rear end of the front adapter A1.

As shown in FIGS. 5 and 6, the adapter holder 40 is disposed on a rear end side of the module case 30. The rear adapter A2 is fixed to the adapter holder 40. A plurality of rear adapters A2 (two in the shown example) are disposed side by side in the left-right direction Y. Each rear adapter A2 protrudes rearward from the adapter holder 40. A multi-core connector (not shown) attached to an optical cord (not shown) can be connected to a rear end of each rear adapter A2. The optical fiber F1 that connects the rear adapter A2 and the plurality of front adapters A1 to each other is connected to a front end of the rear adapter A2.

In the optical wiring unit 3, the optical cord connected to the front end of the front adapter A1 and the optical cord connected to the rear end of the rear adapter A2 can be connected to each other. Specifically, in the optical wiring unit 3, the plurality of single-core connectors connected to the front end of the front adapter A1 are optically connected to the multi-core connector connected to the rear end of the rear adapter A2 through the optical fiber F1 in the module case 30. Accordingly, the optical wiring unit 3 integrates and connects the plurality of single-core connectors to one multi-core connector.

Figure 9:
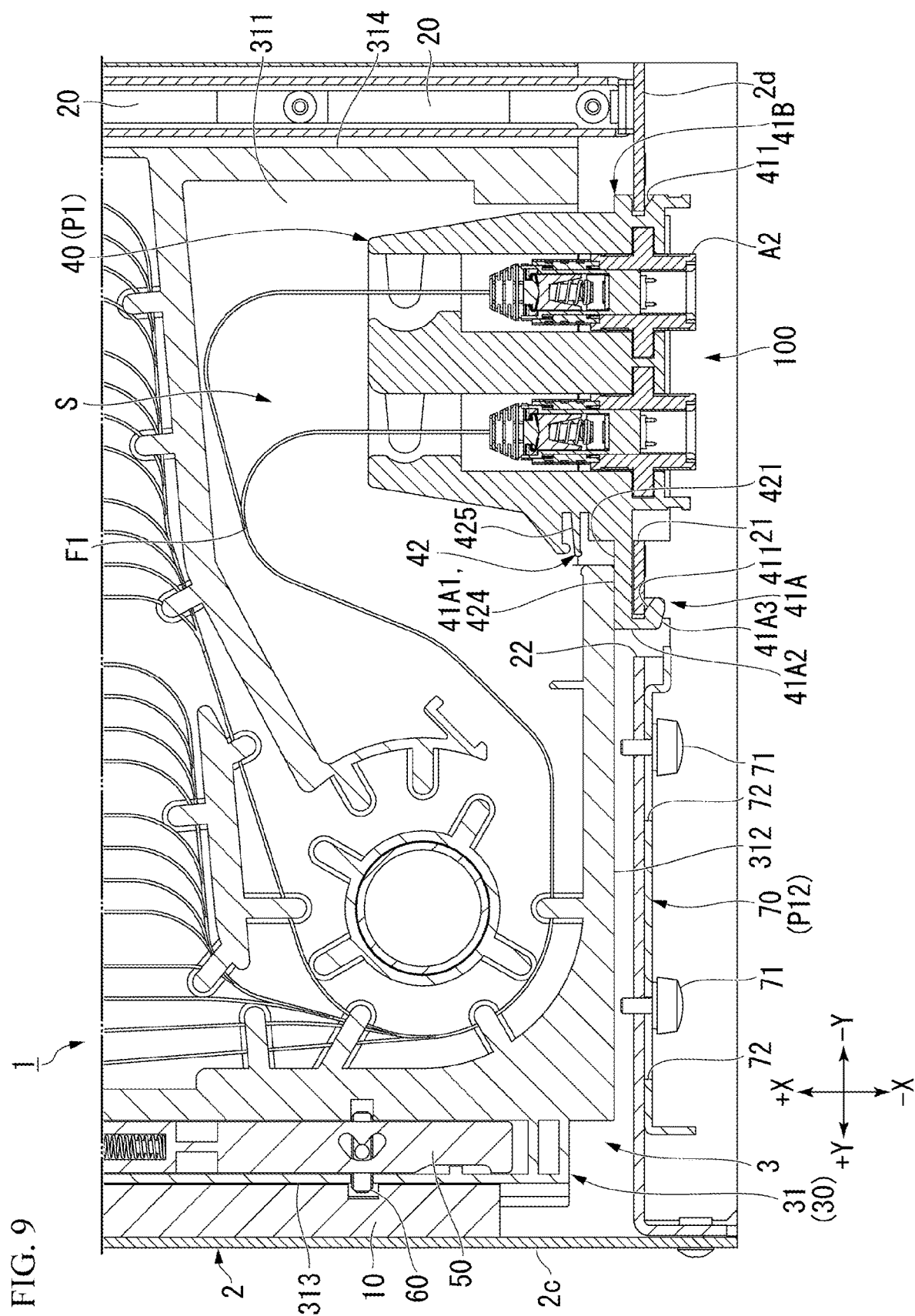
FIG. 9 is a diagram showing a state after the holding member has been moved from the restricted position to a retracted position, from the state shown in FIG. 8.
Figure 10:
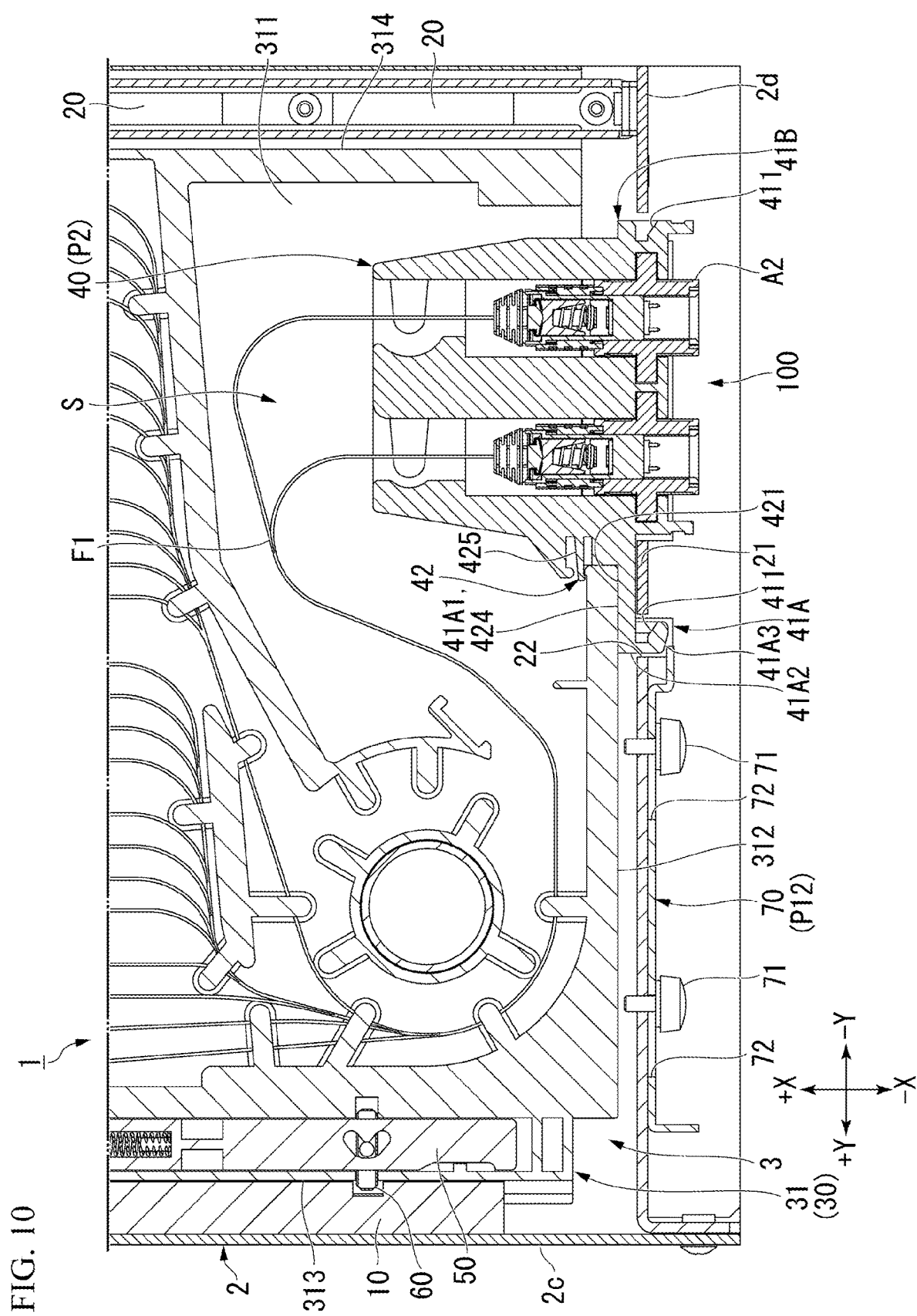
FIG. 10 is a diagram showing a state after the adapter holder has been moved from the first position to a second position where the adapter holder is engaged to the rear end portion of the module case, from the state shown in FIG. 9.

As shown in FIGS. 8 and 9, the adapter holder 40 is configured to fix to the back plate 2d (rear end portion) of the housing 2 such that the rear adapter A2 is exposed to the rear side of the housing 2. Additionally, as shown in FIG. 10, the adapter holder 40 is also configured to fix to the rear wall portion 312 (rear end portion) of the module case 30. The optical termination box 1 of one or more embodiments includes a switching mechanism 100 that switches between a first state in which the adapter holder 40 is fixed to the back plate 2d of the housing 2 and not fixed to the module case 30, as shown in FIGS. 8 and 9, and a second state in which the adapter holder 40 is fixed to the rear wall portion 312 of the module case 30 and not fixed to the housing 2, as shown in FIG. 10.

As shown in FIGS. 7 to 10, the switching mechanism 100 is constituted by first locking portions 41A and 41B and a second locking portion 42 provided on the adapter holder 40.

The first locking portions 41A and 41B are portions of the adapter holder 40 that are engaged to the back plate 2d of the housing 2. The first locking portions 41A and 41B are engaged to the back plate 2d of the housing 2 to restrict the movement of the adapter holder 40 in the front-rear direction X with respect to the housing 2. The first locking portions 41A and 41B are configured to sandwich the back plate 2d of the housing 2 from the front-rear direction X. As the first locking portions 41A and 41B are engaged to the back plate 2d of the housing 2, the adapter holder 40 is fixed to the rear end portion of the housing 2.

In one or more embodiments, the first locking portions 41A and 41B are provided at both end portions of the adapter holder 40 in the left-right direction Y. Each of the first locking portions 41A and 41B has a recess 411 that opens inward (−Y side) in the left-right direction Y. As shown in FIGS. 8 and 9, as the back plate 2d of the housing 2 is inserted into the recesses 411 of the first locking portions 41A and 41B, the movement of the adapter holder 40 in the front-rear direction X with respect to the housing 2 is restricted.

The first locking portion 41B located inside (−Y side) of the adapter holder 40 in the left-right direction Y is engaged to a portion of the back plate 2d of the housing 2 that forms the edge of the first opening portion 21 that allows body portions of the rear adapter A2 and of the adapter holder 40 to be inserted therethrough.

The first locking portion 41A located outside (+Y side) the adapter holder 40 in the left-right direction Y has a first extension portion 41A1, the second extension portion 41A2, and the third extension portion 41A3. The first extension portion 41A1 extends outward in the left-right direction Y from the body portion of the adapter holder 40. The second extension portion 41A2 extends rearward from the tip of the first extension portion 41A1. The third extension portion 41A3 extends inward in the left-right direction Y from the tip of the second extension portion 41A2. The recess 411 of the first locking portion 41A located on the outer side of the adapter holder 40 is formed by the first extension portion 41A1 and the third extension portion 41A3 that are disposed with a space therebetween in the front-rear direction X.

The first locking portion 41A located on the outer side of the adapter holder 40 is engaged to a portion of the back plate 2d of the housing 2 that forms the edge of the second opening portion 22 that allows the second and third extension portions 41A2 and 41A3 to be inserted therethrough.

In a state in which the first locking portions 41A and 41B are engaged to the back plate 2d of the housing 2, the portion of the adapter holder 40 located forward of the first locking portions 41A and 41B is accommodated inside the housing 2. Additionally, the portion of the adapter holder 40 located rearward of the first locking portions 41A and 41B protrudes rearward from the housing 2 (back plate 2d).

As shown in FIG. 7, the first locking portions 41A and 41B of one or more embodiments further have a holding plate portion 412. The holding plate portion 412 holds the position of the adapter holder 40 in the up-down direction Z in a state in which the first locking portions 41A and 41B are engaged to the back plate 2d of the housing 2. The holding plate portion 412 is formed inside the recesses 411 of the first locking portions 41A and 41B such that the plate thickness direction thereof faces the up-down direction Z. The holding plate portion 412 is inserted into a notch 23 that is formed in the portion of the back plate 2d to be inserted into the recesses 411 of the first locking portions 41A and 41B and that opens to the outside (+Y side) in the left-right direction Y, in a state (see FIGS. 8 and 9) in which the back plate 2d is inserted into the recesses 411 of the first locking portions 41A and 41B. In a state in which the holding plate portion 412 is inserted into the notch 23, the position of the adapter holder 40 in the up-down direction Z can be held.

The second locking portion 42 shown in FIGS. 7 to 10 is the portion of the adapter holder 40 that is engaged to the rear wall portion 312 of the module case 30. The second locking portion 42 is engaged to the rear wall portion 312 of the module case 30 to restrict the movement of the adapter holder 40 in the front-rear direction X with respect to the module case 30. The second locking portion 42 is configured to sandwich the rear wall portion 312 of the module case 30 from the front-rear direction X. As the second locking portion 42 is engaged to the rear wall portion 312 of the module case 30, the adapter holder 40 is fixed to the rear end portion of the module case 30.

In one or more embodiments, the second locking portion 42 is located outside (+Y side) the adapter holder 40 in the left-right direction Y. As shown in FIGS. 8 to 10, the second locking portion 42 has a recess 421 that opens outward in the left-right direction Y. The recess 421 of the second locking portion 42 opens in a direction opposite to the recesses 411 of the aforementioned first locking portions 41A and 41B, in the left-right direction Y. As shown in FIG. 10, as the rear wall portion 312 of the module case 30 is inserted into the recess 421 of the second locking portion 42, the movement of the adapter holder 40 in the front-rear direction X with respect to the module case 30 is restricted.

More specifically, the second locking portion 42 has a fourth extension portion 424 and a fifth extension portion 425. The fourth extension portion 424 extends outward in the left-right direction Y from the body portion of the adapter holder 40. The fifth extension portion 425 extends outward in the left-right direction Y from the body portion of the adapter holder 40 forward of the fourth extension portion 424. The recess 421 of the second locking portion 42 is formed by the fourth extension portion 424 and the fifth extension portion 425 disposed with a space therebetween in the front-rear direction X.

In one or more embodiments, the fourth extension portion 424 also serves as the first extension portion 41A1 that constitutes the outer first locking portion 41A. The fifth extension portion 425 is formed to be elastically and flexibly deformable such that a tip portion thereof is displaced in the front-rear direction X. Accordingly, in a state in which the rear wall portion 312 of the module case 30 is inserted into the recess 421 of the second locking portion 42, the rear wall portion 312 of the module case 30 can be sandwiched and held between the fourth and fifth extension portions 424 and 425 due to the elastic force of the fifth extension portion 425.

In a state in which the second locking portion 42 is engaged to the rear wall portion 312 of the module case 30, the portion of the adapter holder 40 located forward of the second locking portion 42 is accommodated in the accommodation space S of the module case 30, and the portion of the adapter holder 40 located rearward of the second locking portion 42 protrudes rearward of the module case 30.

As shown in FIGS. 8 to 10, the switching between the first state and the second state by the switching mechanism 100 can be performed in a state in which the module case 30 is disposed at the storage position. As shown in FIGS. 8 and 9, in a state in which the module case 30 is disposed at the storage position and in a state in which the adapter holder 40 is disposed at a first position P1 where the adapter holder 40 is moved inward (−Y side) in the left-right direction Y, the first locking portions 41A and 41B are engaged to the back plate 2d of the housing 2, and the engagement of the second locking portion 42 to the rear wall portion 312 of the module case 30 is released. Meanwhile, as shown in FIG. 10, in a state in which the module case 30 is disposed at the storage position and in a state in which the adapter holder 40 is disposed at a second position P2 where the adapter holder 40 is moved to the outside (+Y side) in the left-right direction Y from the first position P1, the second locking portion 42 is engaged to the rear wall portion 312 of the module case 30, and the engagement of the first locking portions 41A and 41B to the back plate 2d of the housing 2 is released. That is, simply by moving the adapter holder 40 in the left-right direction Y between the first position P1 and the second position P2 in a state in which the module case 30 is disposed at the storage position, the first state and the second state can be easily switched.

Additionally, in the optical termination box 1 of one or more embodiments, in a state in which the adapter holder 40 is disposed at a third position (not shown) between the first position P1 and the second position P2, the engagement of the first locking portions 41A and 41B to the back plate 2d of the housing 2 is released, and the engagement of the second locking portion 42 to the rear wall portion 312 of the module case 30 is released. That is, the adapter holder 40 is fixed neither to the housing 2 nor to the module case 30 in a state in which the adapter holder 40 is disposed at the third position.

Since the optical termination box 1 of one or more embodiments includes the above-described switching mechanism 100, the module case 30 can be pulled out forward of the housing 2 with the adapter holder 40 and the rear adapter A2 left at the rear end portion of the housing 2 in a state in which the adapter holder 40 and the rear adapter A2 are fixed to the housing 2. In such a state, as shown in FIG. 6, the module case 30 and the adapter are separated from each other in the front-rear direction X. Meanwhile, in a state in which the adapter holder 40 and the rear holder are fixed to the module case 30, the adapter holder 40 and the rear adapter A2 can be pulled out forward of the housing 2 together with the module case 30. That is, the entire optical wiring unit 3 can be pulled out forward of the housing 2.

As shown in FIGS. 2 and 7 to 10, the optical termination box 1 of one or more embodiments further includes a holding member 70.

The holding member 70 holds the adapter holder 40 at the first position P1 shown in FIG. 8. The holding member 70 is attached to the housing 2 so as to be movable between a restricted position P11 shown in FIG. 8 and a retracted position P12 shown in FIGS. 9 and 10. The restricted position P11 is the position of the holding member 70 that restricts the movement of the adapter holder 40 from the first position P1 to the second position P2. The retracted position P12 is the position of the holding member 70 that allows the movement of the adapter holder 40 from the first position P1 to the second position P2.

As shown in FIGS. 2 and 7 to 10, the holding member 70 of one or more embodiments is formed by bending a plate-like member. The holding member 70 is attached to an outer surface (a rear end surface of the housing 2) of the back plate 2d of the housing 2 with two screws 71. Two elongated holes 72 extending in the left-right direction Y are formed in the holding member 70, and a screw 71 is inserted through each elongated hole 72. Accordingly, the holding member 70 is attached to the housing 2 so as to be movable in the left-right direction Y. Additionally, the holding member 70 is sandwiched between the back plate 2d and the two screws 71 by the two screws 71. Therefore, the holding member 70 can be fixed to the housing 2 so as to be immovable.

The holding member 70 is disposed outside in the left-right direction Y with respect to the adapter holder 40. For this reason, as shown in FIG. 8, by disposing the holding member 70 at a position (that is, the restricted position P11) where the holding member 70 is moved inward in the left-right direction Y, the holding member 70 can be brought into contact with the adapter holder 40 disposed at the first position P1 from the outside in the left-right direction Y. Specifically, in a state in which the holding member 70 is disposed at the restricted position P11, the holding member 70 comes into contact with the first locking portion 41A located on the outer side of the adapter holder 40 disposed at the first position P1 from the outside in the left-right direction Y. Then, by fixing the holding member 70 to the back plate 2d with the screws 71 in a state in which the holding member 70 is disposed at the restricted position P11, it is possible to restrict the movement of the adapter holder 40 outward in the left-right direction Y from the first position P1 toward the second position P2.

Meanwhile, as shown in FIGS. 9 and 10, in a state in which the holding member 70 is disposed at a position (that is, the retracted position P12) where the holding member 70 is moved outward in the left-right direction Y, the holding member 70 does not come into contact with the adapter holder 40 from the outside in the left-right direction Y even when the adapter holder 40 is moved between the first position P1 and the second position P2. Accordingly, the adapter holder 40 is allowed to move from the first position P1 to the second position P2 in a state in which the holding member 70 is disposed at the retracted position P12.

In one or more embodiments, as shown in FIG. 2, the above-described holding member 70 is provided so as to correspond to the adapter holders 40 of the plurality of (six in the shown example) optical wiring units 3 lined up in the up-down direction Z. However, the holding member 70 may be provided individually for a plurality of adapter holders 40 lined up vertically, for example.

As shown in FIG. 5, the operating member 50 has a handle portion 51 that protrudes forward from the storage portion 313a of the tray 31. The handle portion 51 is a portion operated by an operator when the module case 30 is slid between the storage position and the pull-out position.

As shown in FIG. 11, the operating member 50 has a first accommodation portion 52 and a second accommodation portion 53. The operating member 50 is biased in the front-rear direction X by a biasing portion B. The biasing portion B in one or more embodiments includes a first compression spring B1 and a second compression spring B2. The first accommodation portion 52 accommodates the first compression spring B1, and the second accommodation portion 53 accommodates the second compression spring B2. A partition wall 36 formed in the tray 31 is disposed between the first accommodation portion 52 and the second accommodation portion 53. In other words, the first accommodation portion 52 and the second accommodation portion 53 are partitioned by the partition wall 36. The first accommodation portion 52, the partition wall 36, and the second accommodation portion 53 are disposed in this order from the front to the rear.

Figure 12:
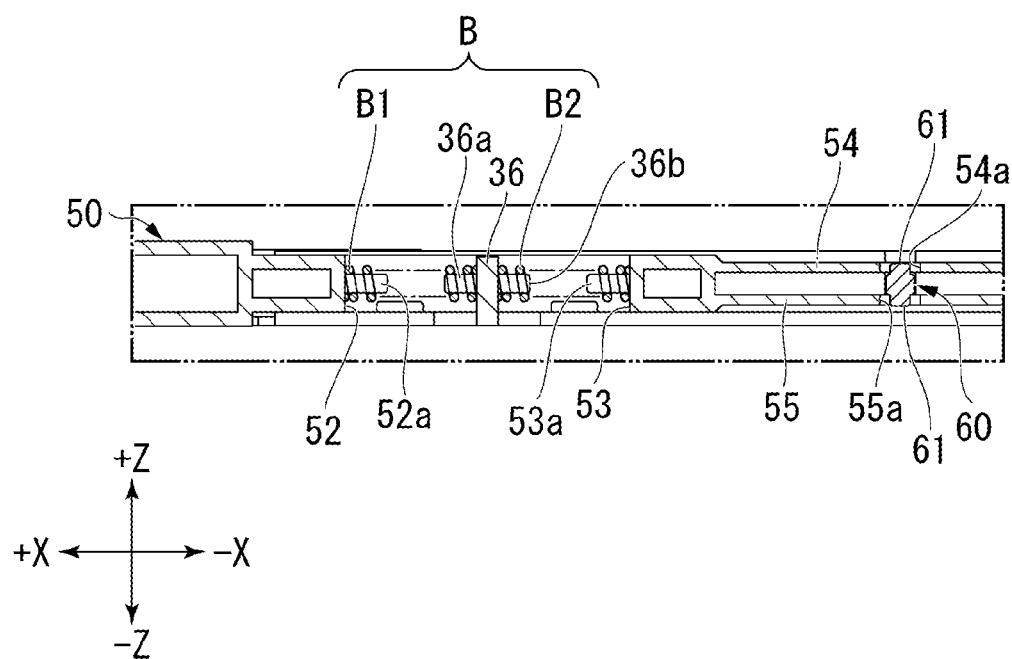
FIG. 12 is a sectional view taken along line XII-XII in FIG. 11.

As shown in FIG. 12, holding portions 52a and 36a are provided inside the first accommodation portion 52 to hold both end portions of the first compression spring B1. Additionally, holding portions 36b and 53a are provided inside the second accommodation portion 53 to hold both end portions of the second compression spring B2. The holding portion 52a protrudes rearward from an inner surface of the first accommodation portion 52, and the holding portion 36a protrudes forward from the partition wall 36. The holding portion 36b protrudes rearward from the partition wall 36, and the holding portion 53a protrudes forward from an inner surface of the second accommodation portion 53. The holding portions 52a, 36a, 36b, and 53a are columnar protrusions. However, as long as the first compression spring B1 and the second compression spring B2 can be held, the shapes of the holding portions 52a, 36a, 36b, and 53a can be changed appropriately, and may be recesses, for example.

Metal coil springs can be adopted as the first compression spring B1 and the second compression spring B2. In addition, as the compression springs B1 and B2, elastic bodies (for example, resin coil springs or rubber) other than the metal coil springs may be used. The compression springs B1 and B2 are accommodated in the first accommodation portion 52 and the second accommodation portion 53 in a state in which the compression springs B1 and B2 are compressed in the front-rear direction. For this reason, in a case where no external force acts on the operating member 50, the position of the operating member 50 in the front-rear direction is determined such that the elastic forces of the compression springs B1 and B2 are balanced with each other. In this way, the position of the operating member 50 when the elastic forces of the compression springs B1 and B2 are balanced with each other is referred to as a "neutral position". As shown in FIG. 11, when the operating member 50 is located at the neutral position, a gap in the front-rear direction X is provided between a rear end of the operating member 50 and a rear end of the storage portion 313a. For this reason, the operating member 50 is movable rearward from the neutral position.

When an external force is applied to the operating member 50 and the operating member 50 moves forward from the neutral position with respect to the tray 31, the first compression spring B1 extends and the second compression spring B2 contracts, the elastic forces are imbalanced with each other, and a rearwardly directed restoring force acts on the operating member 50. Conversely, when the operating member 50 moves rearward from the neutral position with respect to the tray 31, the first compression spring B1 contracts and the second compression spring B2 extends, and a forwardly directed restoring force acts on the operating member 50. Accordingly, when an external force in the front-rear direction X acts on the operating member 50, the operating member 50 moves from the neutral position, but when the external force is released, the operating member 50 is restored and displaced toward the neutral position.

As described above, the operating member 50 is supported by the tray 31 so as to be movable to both sides in the front-rear direction X with the neutral position as a reference. Additionally, the biasing portion B (the first compression spring B1 and the second compression spring B2) is configured to bias the operating member 50 toward the neutral position.

As shown in FIG. 12, the operating member 50 has an upper plate portion 54 and a lower plate portion 55. The upper plate portion 54 and the lower plate portion 55 are disposed with a space therebetween in the up-down direction Z. The upper plate portion 54 is formed with an engagement groove 54a (upper engagement groove), and the lower plate portion 55 is formed with an engagement groove 55a (lower engagement groove). The engagement grooves 54a and 55a pass through the upper plate portion 54 and the lower plate portion 55 in the up-down direction Z.

As shown in FIG. 11, the engagement groove 54a is formed in a V-shape when viewed from above. More specifically, the engagement groove 54a has a first inclined portion 54b and a second inclined portion 54c. The first inclined portion 54b is inclined inward in the left-right direction Y toward the front, and the second inclined portion 54c is inclined inward in the left-right direction Y toward the rear. Although not shown, the engagement groove 55a of the lower plate portion 55 also has the same shape as the engagement groove 54a of the upper plate portion 54. That is, the engagement groove 55a is formed in a V shape when viewed from below, and has a first inclined portion inclined inward in the left-right direction Y toward the front and a second inclined portion inclined inward in the left-right direction Y toward the rear.

As shown in FIGS. 11 and 12, the slide piece 60 has a pair of engagement portions 61 and a latch portion 62. The latch portion 62 extends in the left-right direction Y and is located between the upper plate portion 54 and the lower plate portion 55. The latch portion 62 protrudes from the operating member 50 to both sides in the left-right direction Y. Both end portions of the latch portion 62 in the left-right direction Y are supported by the pair of support portions 313b of the tray 31. Each of the pair of engagement portions 61 protrudes upward or downward from a central portion of the latch portion 62 in the left-right direction Y. The upper engagement portion 61 is located within the engagement groove 54a, and the lower engagement portion 61 is located within the engagement groove 55a. The slide piece 60 is configured to be slidable in the left-right direction Y with respect to the operating member 50.

As shown in FIG. 11, the slide support portion 11 of the side rail 10 is formed with a front locking portion 11c and a rear locking portion 11d. The front locking portion 11c and the rear locking portion 11d are notches formed so as to pass through the rail body portion 11a and the projecting portion 11b of the slide support portion 11 in the up-down direction Z. The front locking portion 11c is located forward of the rear locking portion 11d. When the module case 30 of the optical wiring unit 3 is located at the storage position (FIG. 11 and the like), the latch portion 62 is located inside the rear locking portion 11d. For this reason, the forward movement of the module case 30 with respect to the side rail 10 is restricted.

As described above, the slide piece 60 is slidable in the left-right direction Y with respect to the operating member 50. In the present specification, the position of the slide piece 60 when the latch portion 62 is located inside the front locking portion 11c or the rear locking portion 11d is referred to as a "restricted position". Additionally, the position of the slide piece 60 when the latch portion 62 is disengaged from the front locking portion 11c or the rear locking portion 11d is referred to as a "release position".

Next, the action of the above-described operating member 50 and the slide piece 60 and the configuration related thereto will be described with reference to FIGS. 11 and 13 to 16.

As shown in FIG. 11, in a state in which the module case 30 is at the storage position and before the operating member 50 is operated, the upper engagement portion 61 of the slide piece 60 is located at a connection portion between the first inclined portion 54b and the second inclined portion 54c. In such a state, since the latch portion 62 is located within the rear locking portion 11d, the movement of the slide piece 60 and the operating member 50 in the front-rear direction X with respect to the side rail 10 is restricted. Additionally, since no external force acts on the operating member 50, the operating member 50 is located at the neutral position with respect to the tray 31.

Figure 13:
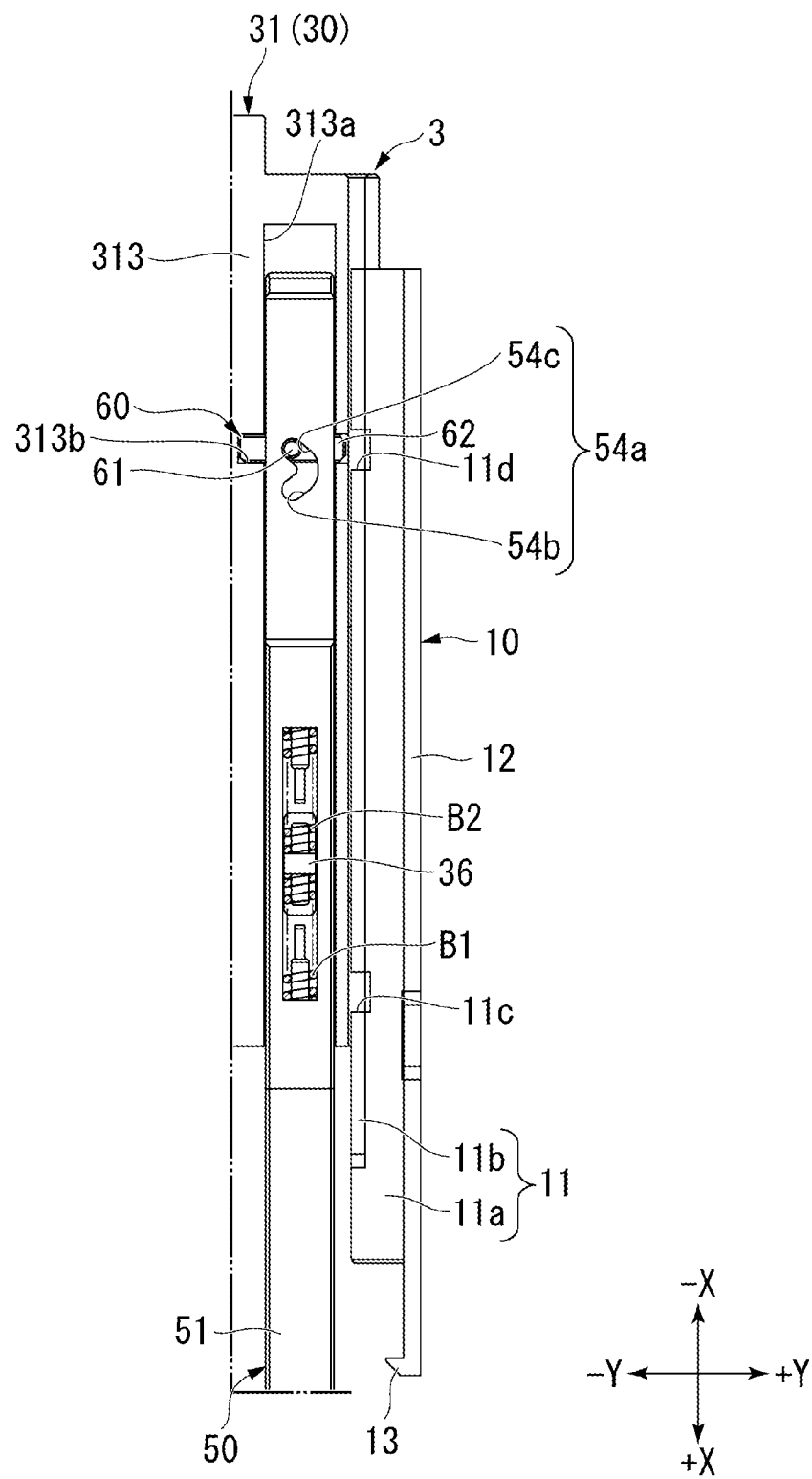
FIG. 13 is a diagram showing the action of each part when the optical wiring unit of FIG. 11 moves forward.

When the operator pulls out the optical wiring unit 3 (especially the module case 30) from the housing 2, the operator grips the handle portion 51 of the operating member 50 and pulls the handle portion 51 to the near side. When an external force is applied in this way, the operating member 50 moves forward from the neutral position with respect to the tray 31. In this case, the first compression spring B1 extends and the second compression spring B2 contracts, and the operating member 50 is biased rearward. Additionally, as shown in FIG. 13, the upper engagement portion 61 slides along the second inclined portion 54c of the engagement groove 54a. Similarly, the lower engagement portion 61 slides along the second inclined portion of the engagement groove 55a. Since the operations of the pair of engagement portions 61 with respect to the engagement grooves 54a and 55a are the same, the operation of the upper engagement portion 61 will be described as the representative of the operation of the pair of engagement portions 61 in the following description.

When the engagement portion 61 slides toward a rear end portion of the second inclined portion 54c, the slide piece 60 moves inward in the left-right direction Y. Accordingly, the latch portion 62 is disengaged from the rear locking portion 11d, and the module case 30 is movable forward with respect to the side rail 10. Since the latch portion 62 is supported by the support portion 313b, when the operator continues pulling the operating member 50 forward, a forwardly directed force also acts on the tray 31. Accordingly, the module case 30 moves forward.

Figure 14:
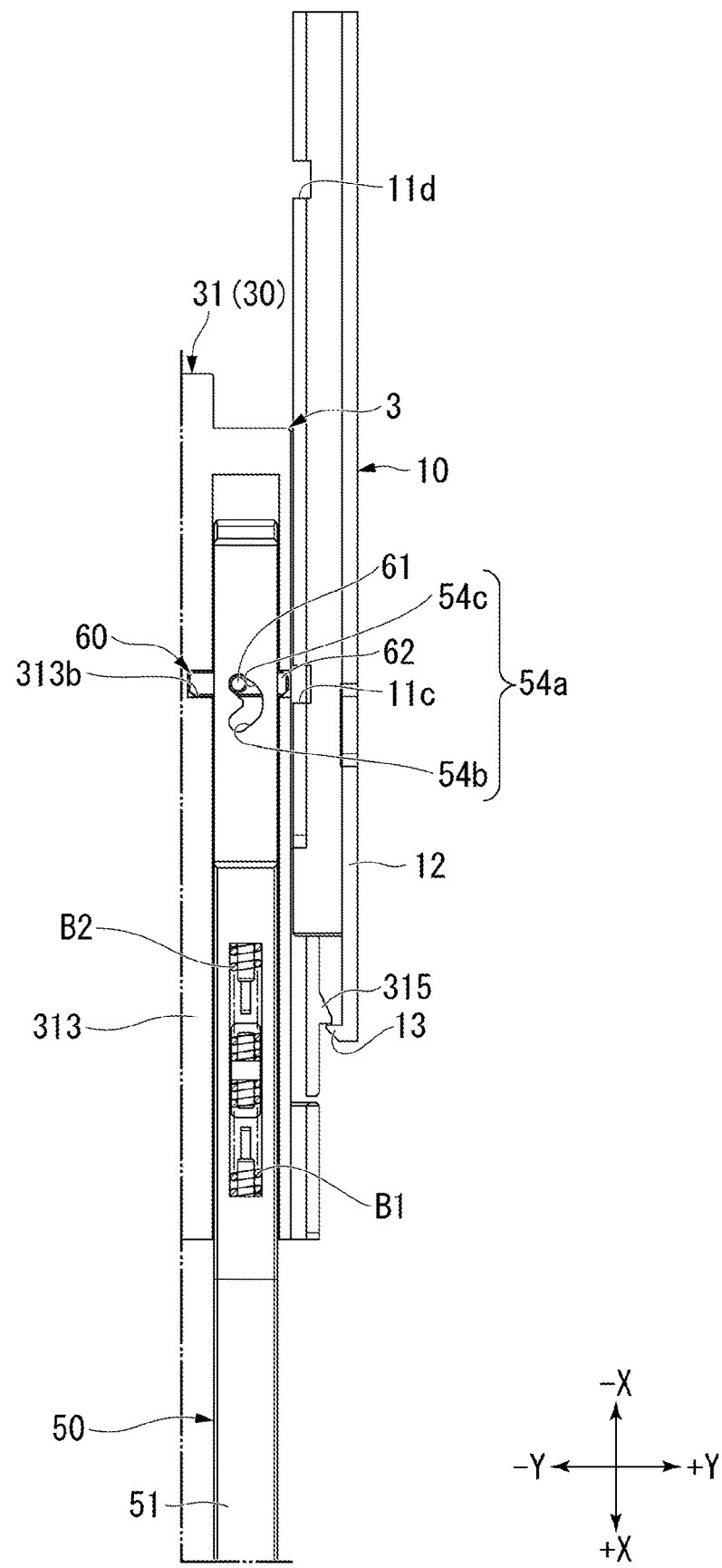
FIG. 14 is a diagram showing a process subsequent to FIG. 13.

As shown in FIG. 14, when the module case 30 moves forward by a predetermined amount, the first unit-side restricting portion 315 comes into contact with a rear end of the rail-side restricting portion 13. In this case, although not shown, the second unit-side restricting portion 323 also comes into contact with the rear end of the rail-side restricting portion 13. In this way, the unit-side restricting portions 315 and 323 come into contact with the rear end of the rail-side restricting portion 13, thereby restricting the forward movement of the module case 30 beyond the pull-out position. Since the operating member 50 is biased rearward by the balance between the elastic forces of the compression springs B1 and B2, the operating member 50 moves rearward with respect to the tray 31 when the operator releases the operating member 50. In this case, as the engagement portion 61 moves along the second inclined portion 54c, the slide piece 60 slides outward in the left-right direction Y.

Figure 15:
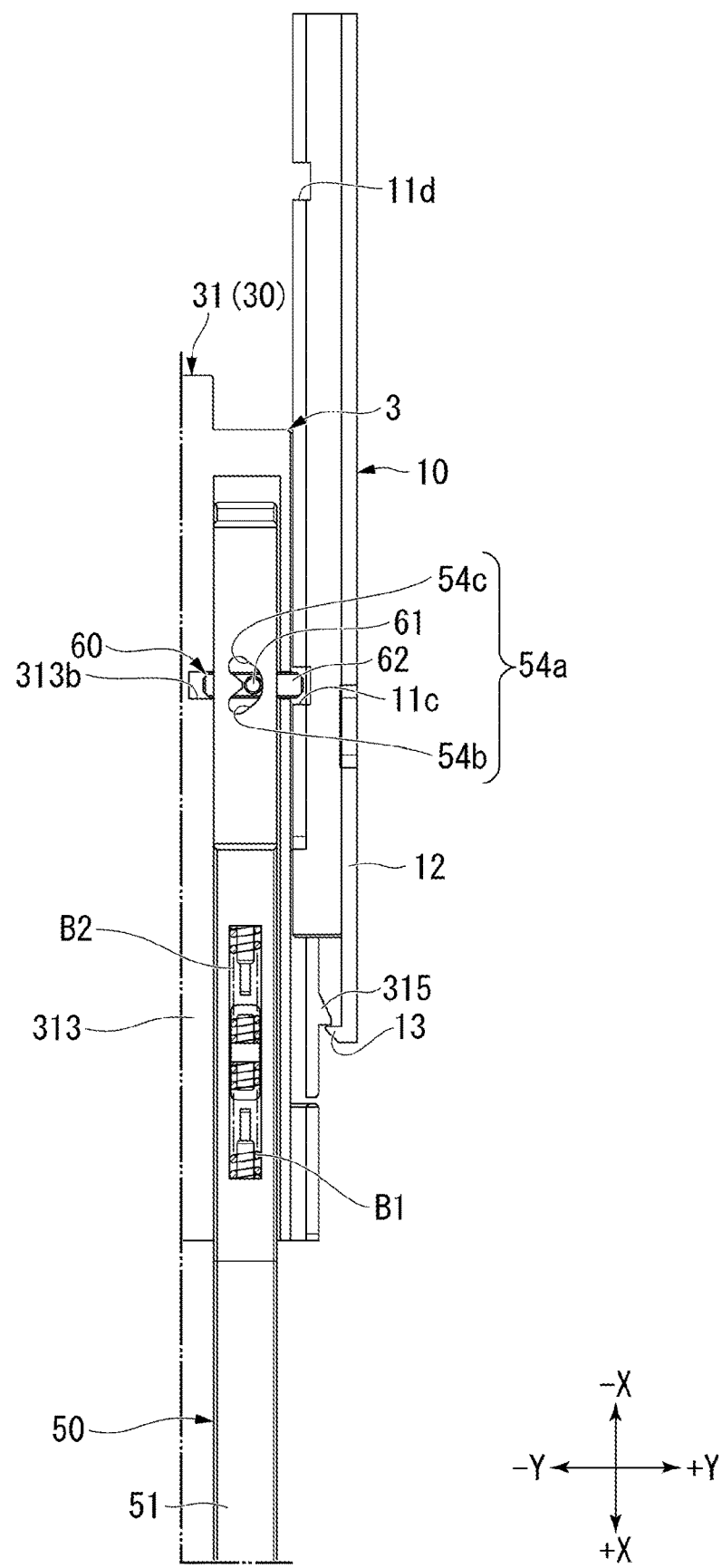
FIG. 15 is a diagram showing a process subsequent to FIG. 14.

As shown in FIG. 15, the operating member 50 moves rearward and reaches the neutral position, and the latch portion 62 enters the front locking portion 11c. Accordingly, the movement of the module case 30 in the front-rear direction X with respect to the side rails 10 is restricted. Accordingly, even when a rearwardly directed external force is applied to the module case 30 as the operator performs the operation of inserting a connector into the front adapter A1, the forward movement of the module case 30 is restricted. Accordingly, the module case 30 can be stably located at the pull-out position, and the connection work of the connector to the front adapter A1, or the like can be easily performed.

Figure 16:
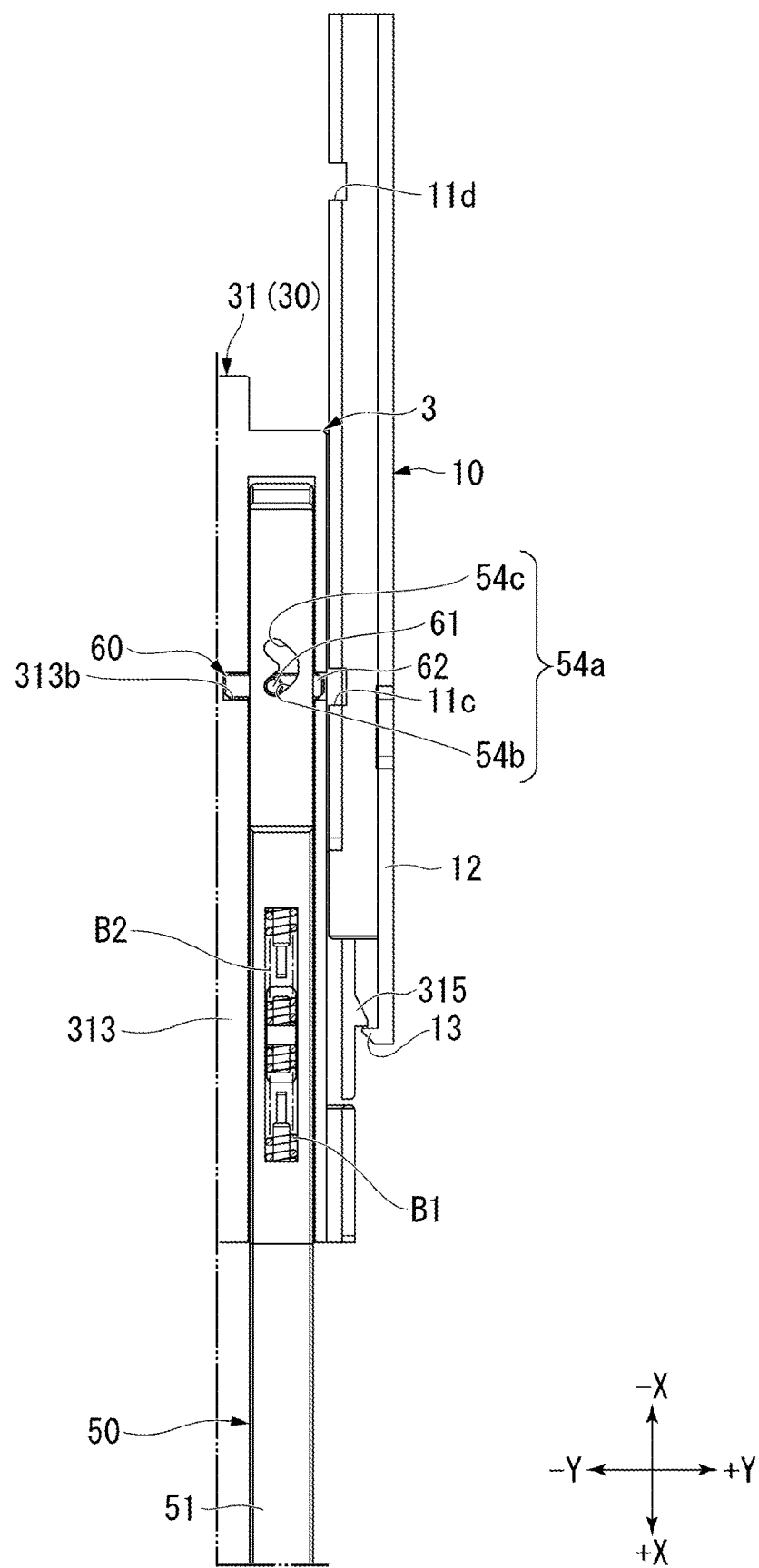
FIG. 16 is a diagram showing a process subsequent to FIG. 15.

When the module case 30 is stored in the housing 2 again, the operator performs the operation of pushing the handle portion 51. When an external force is applied in this way, the operating member 50 moves rearward from the neutral position with respect to the tray 31. In this case, the first compression spring B1 contracts and the second compression spring B2 extends, and the operating member 50 is biased forward. Additionally, as shown in FIG. 16, the engagement portion 61 slides along the first inclined portion 54b of the engagement groove 54a. When the engagement portion 61 slides toward a front end portion of the first inclined portion 54b, the slide piece 60 moves inward in the left-right direction Y. Accordingly, the latch portion 62 is disengaged from the front locking portion 11c, and the module case 30 is movable rearward with respect to the side rail 10.

When the operating member 50 is further pushed rearward, the module case 30 moves rearward with respect to the side rail 10, and the module case 30 abuts against the back plate 2d of the housing 2 and stops moving. When the operator releases the operating member 50 in this state, the operating member 50 moves forward with respect to the tray 31 due to the balance between the elastic forces of the compression springs B1 and B2. In this case, as the engagement portion 61 moves along the first inclined portion 54b, the slide piece 60 slides outward in the left-right direction Y. Accordingly, the engagement portion 61 enters the rear locking portion 11d again and returns to the state shown in FIG. 11.

In the optical termination box 1 of one or more embodiments configured as described above, in a case where an operation such as inserting a connector into the front adapter A1 is performed, first, as shown in FIGS. 8 and 9, the adapter holder 40 is disposed at the first position P1 and fixed to the back plate 2d of the housing 2. In such a state, as shown in FIG. 8, the holding member 70 may be disposed at the restricted position P11 to hold the adapter holder 40 at the first position P1. Additionally, the holding member 70 may be fixed at the restricted position P11 with the screws 71. Next, the operator operates the operating member 50 to move the module case 30 forward from the storage position shown in FIG. 11 to the pull-out position shown in FIG. 15 with respect to the housing 2 and the adapter holder 40 fixed to the housing 2. Even when the module case 30 is moved to the pull-out position in this way, the optical cord (not shown) connected to the rear end of the rear adapter A2 will not enter the inside of the housing 2.

Additionally, in the optical termination box 1 of one or more embodiments, the entire optical wiring unit 3 including the module case 30 and the adapter holder 40 can be detached from the housing 2 as a whole. In order to detach the entire optical wiring unit 3 from the housing 2, first, as shown in FIGS. 8 and 9, the operator moves the holding member 70 from the restricted position P11 to the retracted position P12 in a state in which the fixation of the holding member 70 to the housing 2 with the screws 71 is released. Here, the holding member 70 may be fixed at the retracted position P12 with the screws 71. Next, as shown in FIG. 10, the operator moves the adapter holder 40 from the first position P1 to the second position P2 to fix the adapter holder 40 to the rear wall portion 312 of the module case 30.

Thereafter, the operator operates the operating member 50 to move the module case 30 forward with respect to the housing 2 from the storage position shown in FIG. 11 to the pull-out position shown in FIG. 15. Here, since the adapter holder 40 is fixed to the module case 30, the entire optical wiring unit 3 including the module case 30 and the adapter holder 40 moves forward to the pull-out position.

In a state in which the optical wiring unit 3 is disposed at the pull-out position, the unit-side restricting portions 315 and 323 of the module case 30 comes into contact with the rear end of the rail-side restricting portion 13. Here, the operator elastically displaces the portions of the module case 30 where the unit-side restricting portions 315 and 323 are formed, inward (−Y side) in the left-right direction Y with respect to the other portions of the module case 30. Accordingly, the contact of the rear end of the rail-side restricting portion 13 against the unit-side restricting portions 315 and 323 can be released to move the module case 30 (the entire optical wiring unit 3) forward of the pull-out position.

As described above, the entire optical wiring unit 3 can be collectively detached from the housing 2.

Meanwhile, when the optical wiring unit 3 including the module case 30 and the adapter holder 40 is attached to the housing 2, first, the operator pushes the handle portion 51 of the operating member 50 rearward after inserting both end portions of the module case 30 in the left-right direction Y into the central rail 20 and the side rail 10. Accordingly, the module case 30 can be disposed at the storage position. Next, the operator moves the adapter holder 40 from the second position P2 shown in FIG. 10 to the first position P1 shown in FIG. 9 to fix the adapter holder 40 to the back plate 2d of the housing 2. Thereafter, the operator moves the holding member 70 from the retracted position P12 shown in FIG. 9 to the restricted position P11 shown in FIG. 8, in a state in which the fixation of the holding member 70 to the housing 2 with the screws 71 is released. Finally, the operator fixes the holding member 70 to the restricted position P11 with the screws 71 to complete the attachment of the optical wiring unit 3 to the housing 2.

As described above, in the optical termination box 1 of one or more embodiments, the optical wiring unit 3 is separable into the module case 30 to which the front adapter A1 is fixed and the adapter holder 40 to which the rear adapter A2 is fixed. Additionally, the adapter holder 40 is configured to fix to the back plate 2d (rear end portion) of the housing 2.

For this reason, by pulling out the module case 30 (and the front adapter A1) forward of the housing 2 in a state in which the adapter holder 40 is fixed to the back plate 2d of the housing 2, the optical cord can be inserted into and removed from the front adapter A1. Here, even when the module case 30 is pulled out forward, the optical cord connected to the rear end of the rear adapter A2 does not enter the inside of the housing 2. Accordingly, it is not necessary to provide a space inside the housing 2 that accommodates the optical cord connected to the rear end of the rear adapter A2. As a result, a small-sized optical termination box 1 can be obtained.

Additionally, in the optical termination box 1 of one or more embodiments, the adapter holder 40 has the first locking portions 41A and 41B that are engaged to the back plate 2d (rear end portion) of the housing 2 to restrict the movement of the adapter holder 40 in the front-rear direction with respect to the housing 2. Additionally, the adapter holder 40 also has the second locking portion 42 that is engaged to the rear wall portion 312 (rear end portion) of the module case 30 to restrict the movement of the adapter holder 40 in the front-rear direction X with respect to the module case 30. In a state in which the adapter holder 40 is disposed at the first position P1 where the adapter holder 40 is moved inward (to a first side) in the left-right direction Y, the first locking portions 41A and 41B are engaged to the back plate 2d of the housing 2, and the engagement of the second locking portion 42 to the rear wall portion 312 of the module case 30 is released. Meanwhile, in a state in which the adapter holder 40 is disposed at the second position P2 where the adapter holder 40 is moved to the outside (a second side) in the left-right direction Y, the second locking portion 42 is engaged to the rear wall portion 312 of the module case 30, and the engagement of the first locking portions 41A and 41B to the back plate 2d of the housing 2 is released.

According to such a configuration, in a state in which the adapter holder 40 is disposed at the first position P1 and in a state in which the front adapter holder 40 and the rear adapter A2 are fixed to the rear end portion of the housing 2, the module case 30 and the front adapter A1 can be pulled out forward of the housing 2.

Meanwhile, in the state where the adapter holder 40 is disposed at the second position P2, the adapter holder 40 can be pulled out forward of the housing 2 together with the module case 30. That is, the optical wiring unit 3 including the front adapter A1 and the rear adapter A2 can be easily detached from the housing 2 collectively. Accordingly, the maintenance of the optical termination box 1 can be easily performed by replacing the entire optical wiring unit 3.

Additionally, in the optical termination box 1 of one or more embodiments, in a state in which the adapter holder 40 is disposed at the third position between the first position P1 and the second position P2, the engagement of the first locking portions 41A and 41B to the back plate 2d of the housing 2 is released, and the engagement of the second locking portion 42 to the rear wall portion 312 of the module case 30 is released. That is, the adapter holder 40 is not engaged to both the back plate 2d of the housing 2 and the rear wall portion 312 of the module case 30 at the same time. For this reason, when the module case 30 is pulled out forward with respect to the housing 2, it is possible to prevent stress from acting on the first locking portions 41A and 41B and the second locking portion 42. That is, the first locking portions 41A and 41B and the second locking portion 42 can be protected.

Additionally, the optical termination box 1 of one or more embodiments also includes the holding member 70 that holds the adapter holder 40 at the first position P1. The holding member 70 is attached to the housing 2 to be movable between the restricted position P11 where the movement of the adapter holder 40 from the first position P1 to the second position P2 is restricted, and the retracted position P12 where the movement of the adapter holder 40 from the first position P1 to the second position P2 is allowed.

Such a holding member 70 can prevent the adapter holder 40 from unexpectedly coming off the back plate 2d of the housing 2. This is particularly effective when the module case 30 is pulled out forward of the housing 2 in a state in which the adapter holder 40 is held on the back plate 2d of the housing 2. Additionally, since the holding member 70 can move between the restricted position P11 and the retracted position P12 in a state where the holding member 70 is attached to the housing 2, it is possible to prevent the holding member 70 from being lost.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, the optical termination box of one or more embodiments may be configured such that the switching mechanism 100 is not provided and the adapter holder 40 is always fixed to the rear end portion of the housing 2.

REFERENCE SIGNS LIST

1: Optical termination box
2: Housing
2d: Back plate (rear end portion)
30: Module case
312: Rear wall portion (rear end portion)
40: Adapter holder
41A, 41B: First locking portion
42: Second locking portion
70: Holding member
A1: Front adapter
A2: Rear adapter
F1: Optical fiber
P1: First position
P2: Second position
P11: Restricted position
P12: Retracted position
X: Front-rear direction
Y: Left-right direction (perpendicular direction)

What is claimed is:

1. An optical termination box comprising:
a housing;
a module case slidably attached in a front-rear direction with respect to the housing;
a front adapter fixed to a front end of the module case;
an adapter holder disposed on a rear end side of the module case;
a rear adapter fixed to the adapter holder; and
an optical fiber that connects the front adapter to the rear adapter, wherein
the adapter holder is fixed to a rear end portion of the housing such that the rear adapter is exposed rearward of the housing,
the adapter holder includes:
  a first locking portion that is engaged to the rear end portion of the housing and that restricts movement of the adapter holder in the front-rear direction with respect to the housing; and
  a second locking portion that is engaged to a rear end portion of the module case and that restricts movement of the adapter holder in the front-rear direction with respect to the module case,
when the adapter holder moves toward a first side in a perpendicular direction perpendicular to the front-rear direction and is disposed at a first position, the first locking portion is engaged to the rear end portion of the housing, and an engagement of the second locking portion to the rear end portion of the module case is released, and
when the adapter holder moves toward a second side in the perpendicular direction and is disposed at a second position, the second locking portion is engaged to the rear end portion of the module case, and an engagement of the first locking portion to the rear end portion of the housing is released.

2. The optical termination box according to claim 1, further comprising:
a holding member that holds the adapter holder at the first position, wherein
the holding member is attached to the housing to move between a restricted position where movement of the adapter holder from the first position to the second position is restricted and a retracted position where the movement of the adapter holder from the first position to the second position is allowed.

* * * * *